US012811277B2

(12) United States Patent
Lee et al.

(10) Patent No.: US 12,811,277 B2
(45) Date of Patent: Nov. 24, 2026

(54) ELECTRONIC DEVICE INCLUDING CONDUCTIVE PORTIONS OF HOUSING OPERATING AS ANTENNA

(71) Applicant: Samsung Electronics Co., Ltd., Suwon-si (KR)

(72) Inventors: Hyungjoo Lee, Suwon-si (KR); Seongjin Park, Suwon-si (KR); Hosaeng Kim, Suwon-si (KR); Sumin Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 18/494,274

(22) Filed: Oct. 25, 2023

(65) Prior Publication Data

US 2024/0113415 A1 Apr. 4, 2024

Related U.S. Application Data

(63) Continuation of application No. PCT/KR2023/015248, filed on Oct. 4, 2023.

(30) Foreign Application Priority Data

Oct. 4, 2022 (KR) ........................ 10-2022-0126169
Nov. 2, 2022 (KR) ........................ 10-2022-0144828

(51) Int. Cl.
*H01Q 1/24* (2006.01)
*G06F 1/16* (2006.01)
(Continued)

(52) U.S. Cl.
CPC ............... *H01Q 1/243* (2013.01); *H01Q 3/36* (2013.01); *H04B 1/40* (2013.01)

(58) Field of Classification Search
None
See application file for complete search history.

(56) References Cited

U.S. PATENT DOCUMENTS 6,542,117 B1 4/2003 Broughton
7,436,364 B2 10/2008 Nishikido et al.
(Continued)

FOREIGN PATENT DOCUMENTS

CN 105186143 A 12/2015
CN 112018494 A 12/2020
(Continued)

OTHER PUBLICATIONS

International Search Report dated Jan. 22, 2024, issued in International Application No. PCT/KR2023/015248.
(Continued)

*Primary Examiner* — Tuan A Tran
(74) *Attorney, Agent, or Firm* — Jefferson IP Law, LLP

(57) ABSTRACT

An electronic device is provided. The electronic device includes a housing, a first conductive portion, a second conductive portion, a non-conductive portion between the first conductive portion and the second conductive portion, a power divider, a first wireless communication circuit, and a processor. The power divider is connected to a first portion of the first conductive portion, and is connected to a third portion of the second conductive portion, the third portion close to the non-conductive portion. The electronic device may include a communication circuitry. The first wireless communication circuit is connected to the power divider. The processor is configured to transmit a first signal having a first phase from the wireless communication circuit through the first conductive portion to a first external electronic device and simultaneously transmit the first signal
(Continued)

having a second phase through the second conductive portion to the first external electronic device.

20 Claims, 12 Drawing Sheets

(51) Int. Cl.

| | |
|---|---|
| ***H01Q 1/36*** | (2006.01) |
| ***H01Q 3/36*** | (2006.01) |
| ***H04B 1/3888*** | (2015.01) |
| ***H04B 1/40*** | (2015.01) |

(56) References Cited

U.S. PATENT DOCUMENTS

| | | | | |
|---|---|---|---|---|
| 8,081,123 | B2 * | 12/2011 | Yang | H01Q 21/10 343/702 |
| 8,988,306 | B2 * | 3/2015 | Kuo | H01Q 9/42 343/876 |
| 9,287,941 | B2 * | 3/2016 | Pajona | H04B 7/043 |
| 9,431,693 | B2 * | 8/2016 | Kwak | H01Q 7/00 |
| 9,762,710 | B2 * | 9/2017 | Lee | H01Q 1/48 |
| 9,954,278 | B1 * | 4/2018 | Moretti | H01Q 21/061 |
| 10,734,710 | B1 * | 8/2020 | Navarro | H01Q 21/205 |
| 10,951,245 | B2 * | 3/2021 | Lee | H04B 1/006 |
| 11,088,470 | B2 * | 8/2021 | Kwon | H01Q 1/16 |
| 11,223,106 | B2 * | 1/2022 | Khripkov | H01Q 9/26 |
| 11,349,204 | B2 * | 5/2022 | Wu | H01Q 9/0414 |
| 11,387,891 | B2 * | 7/2022 | Ying | H04B 7/0689 |
| 11,757,174 | B2 * | 9/2023 | Lee | H01Q 21/062 343/700 MS |
| 11,848,483 | B2 * | 12/2023 | Han | H01Q 21/29 |
| 11,923,878 | B2 * | 3/2024 | Shimura | H04B 7/0617 |
| 11,967,751 | B2 * | 4/2024 | Park | H01Q 21/08 |
| 12,009,576 | B2 * | 6/2024 | Varma | H04M 1/026 |
| 12,081,246 | B2 | 9/2024 | Kim et al. | |
| 12,142,819 | B2 * | 11/2024 | Kuna | G06F 1/1656 |
| 12,206,176 | B2 * | 1/2025 | Compton | H01Q 1/243 |
| 12,315,988 | B2 * | 5/2025 | Lee | H01Q 1/243 |
| 12,592,488 | B1 * | 3/2026 | Wang | H01Q 9/0414 |
| 2015/0145731 | A1 * | 5/2015 | Jhang | H01Q 21/30 343/702 |
| 2016/0308563 | A1 * | 10/2016 | Ouyang | H01Q 25/005 |
| 2021/0044026 | A1 * | 2/2021 | Cho | H01Q 1/38 |
| 2022/0069479 | A1 * | 3/2022 | Wangsvick | H01Q 1/286 |
| 2022/0085864 | A1 * | 3/2022 | Ying | H04B 1/40 |
| 2022/0200640 | A1 | 6/2022 | Kim et al. | |
| 2022/0312348 | A1 * | 9/2022 | Drogi | H04B 7/0602 |
| 2022/0407233 | A1 | 12/2022 | Woo | |
| 2023/0123914 | A1 * | 4/2023 | Lee | H01Q 19/30 343/893 |
| 2023/0188173 | A1 | 6/2023 | Yun et al. | |
| 2023/0208027 | A1 | 6/2023 | Wang | |
| 2023/0238686 | A1 | 7/2023 | Kim et al. | |
| 2023/0262151 | A1 | 8/2023 | Yun et al. | |
| 2024/0154295 | A1 | 5/2024 | Cai et al. | |

FOREIGN PATENT DOCUMENTS

| | | | |
|---|---|---|---|
| CN | 112993545 | A | 6/2021 |
| CN | 113991291 | A | 1/2022 |
| CN | 114628887 | A | 6/2022 |
| KR | 2001-0012612 | A | 2/2001 |
| KR | 10-2006-0063999 | A | 6/2006 |
| KR | 10-0677391 | B1 | 2/2007 |
| KR | 10-2020-0012106 | A | 2/2020 |
| KR | 10-2020-0028256 | A | 3/2020 |
| KR | 10-2022-0012419 | A | 2/2022 |
| KR | 10-2022-0017157 | A | 2/2022 |
| KR | 10-2526400 | B1 | 4/2023 |
| WO | 2022/048512 | A1 | 3/2022 |
| WO | 2022/086089 | A1 | 4/2022 |
| WO | 2022/194155 | A1 | 9/2022 |

OTHER PUBLICATIONS

European Search Report dated Nov. 10, 2025, issued in European Application No. 23875211.7.

European Search Report dated Feb. 3, 2026, issued in European Application No. 23875211.7.

* cited by examiner

ELECTRONIC DEVICE INCLUDING CONDUCTIVE PORTIONS OF HOUSING OPERATING AS ANTENNA

CROSS-REFERENCE TO RELATED APPLICATION(S)

This application is a continuation application, claiming priority under § 365(c), of an International application No. PCT/KR2023/015248, filed on Oct. 4, 2023, which is based on and claims the benefit of a Korean patent application number 10-2022-0126169, filed on Oct. 4, 2022, in the Korean Intellectual Property Office, and of a Korean patent application number 10-2022-0144828, filed on Nov. 2, 2022, in the Korean Intellectual Property Office, the disclosure of each of which is incorporated by reference herein in its entirety.

TECHNICAL FIELD

The disclosure relates to an electronic device including conductive portions of a housing operating as an antenna.

BACKGROUND ART

An electronic device may provide conductive portions of a housing as an antenna. At least some of the conductive portions of the housing may be used to transmit and/or receive signals of a specific frequency band to an external electronic device.

The electronic device may include an array antenna to increase the directivity of the antenna.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device including conductive portions of a housing operating as an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing. The housing may include a first conductive portion disposed along an edge of the housing, a second conductive portion disposed along the edge, and a non-conductive portion between the first conductive portion and the second conductive portion. The electronic device may include a power divider. The power divider may be electrically connected to, among a first portion including a first end and a second portion including a second end of the first conductive portion, the first portion close to the non-conductive portion, and may be electrically connected to, among a third portion including a third end and a fourth portion including a fourth end of the second conductive portion, the third portion close to the non-conductive portion. The electronic device may include a first wireless communication circuit. The first wireless communication circuit may be connected to the power divider. The electronic device may include a processor. The processor may be configured to transmit a first signal having a first phase to a first external electronic device through the first conductive portion, with a second power distributed from power provided to the power divider from the first wireless communication circuit. The processor may be configured to, while the first signal having the first phase is transmitted, transmit the first signal having a second phase, the second phase being different from the first phase to the first external electronic device through the second conductive portion, with a third power distributed from the power.

In accordance with another aspect of the disclosure, an electronic device is provided. The electronic device includes a housing. The housing includes a first conductive portion disposed along an edge of the housing, a second conductive portion disposed along the edge, and a non-conductive portion between the first conductive portion and the second conductive portion. The electronic device includes a ground portion. The ground portion may be configured to be disposed in the housing, connected to the first conductive portion, and spaced apart from the second conductive portion. The electronic device includes a first wireless communication circuit and a second wireless communication circuit. The first wireless communication circuit may be electrically connected to, among a first portion including a first end and a second portion including a second end of the first conductive portion, the first portion close to the non-conductive portion. The second wireless communication circuit may be electrically connected to, among a third portion including a third end and a fourth portion including a fourth end of the second conductive portion, the third portion close to the non-conductive portion. The electronic device includes a processor. The processor may be configured to transmit a first signal having a first phase to a first external electronic device through the first conductive portion, with a second power obtained from the first wireless communication circuit. The processor may be configured to, while the first signal having the first phase is transmitted, transmit a second signal having a second phase, the second phase being different from the first phase, to the first external electronic device through the second conductive portion, with a third power obtained from the second wireless communication circuit.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
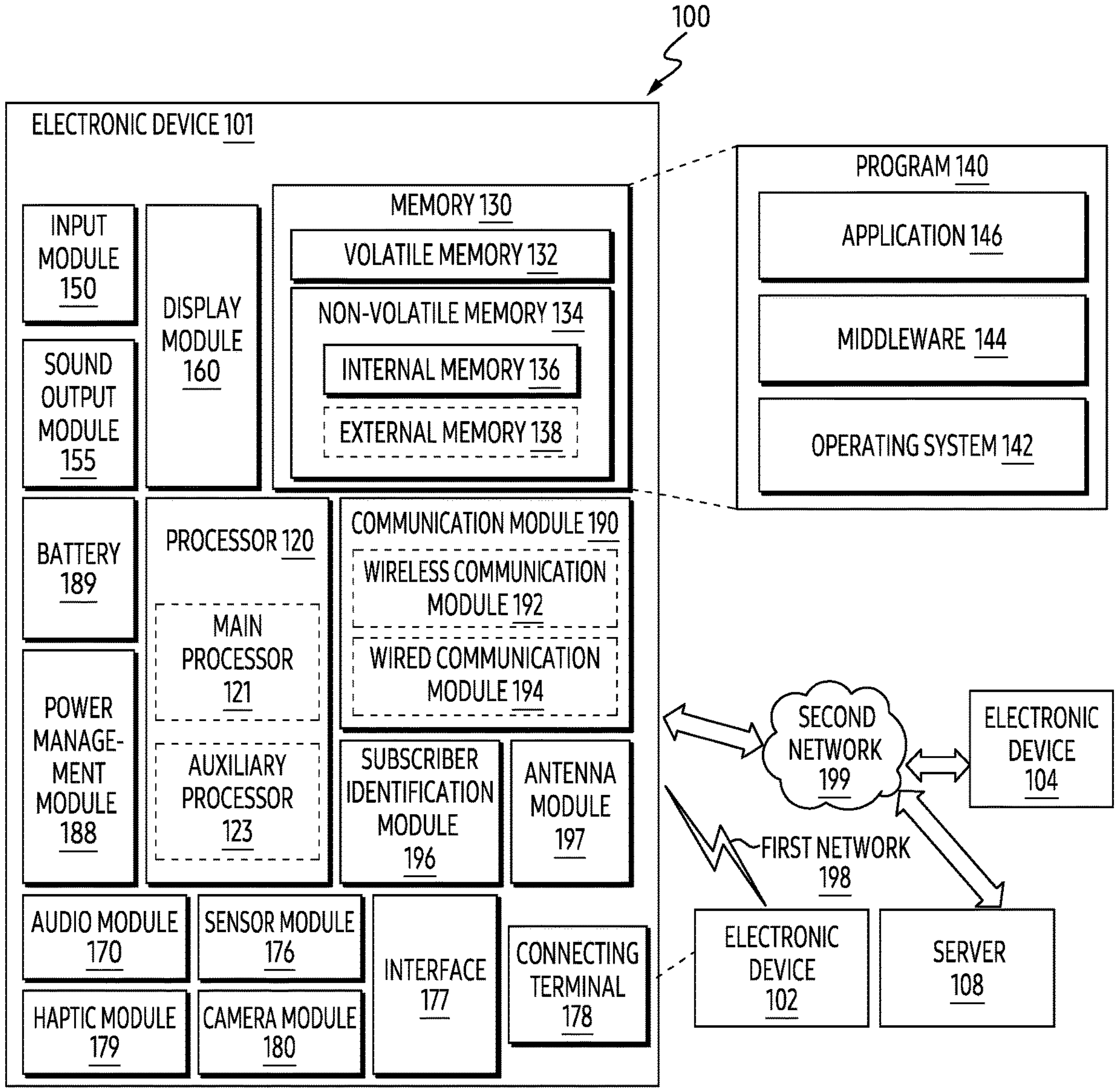
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an example, the electronic device 101 communicates with the electronic device 104 via the server 108. According to an example, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an example, as at least part of the data processing or computation, the processor 120 stores a command or data received from another component (e.g., the sensor module 176 or the communication module 190) in a volatile memory 132, process the command or the data stored in the volatile memory 132, and store resulting data in a non-volatile memory 134. According to an example, the processor 120 includes a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an example, the auxiliary processor 123 (e.g., an image signal processor or a communication processor) is implemented as part of another component (e.g., the camera module 180 or the communication module 190) functionally related to the auxiliary processor 123. According to an example, the auxiliary processor 123 (e.g., the neural processing unit) includes a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an example, the receiver is implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an example, the display module 160 includes a touch sensor adapted to detect a touch, or a pressure sensor adapted to measure the intensity of force incurred by the touch.

The audio module 170 may convert a sound into an electrical signal and vice versa. According to an example, the audio module 170 obtains the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an example, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example, the interface 177 includes a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an example, the connecting terminal 178 includes a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an example, the haptic module 179 includes a motor, a piezoelectric element, or an electric stimulator.

The camera module 180 may capture a still image or moving images. According to an example, the camera module 180 includes one or more lenses, image sensors, image signal processors, or flashes.

The power management module 188 may manage power supplied to the electronic device 101. According to an example, the power management module 188 is implemented as at least part of a power management integrated circuit (PMIC).

The battery 189 may supply power to at least one component of the electronic device 101. According to an example, the battery 189 includes a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an example, the communication module 190 includes a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an example, the wireless communication module 192 supports a peak data rate (e.g., 20 gigabits per second (Gbps) or more) for implementing eMBB, loss coverage (e.g., 164 decibel (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example, the antenna module 197 includes an antenna including a radiating element including a conductive material or a conductive pattern formed in or on a substrate (e.g., a printed circuit board (PCB)). According to an example, the antenna module 197 includes a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an example, another component (e.g., a radio frequency integrated circuit (RFIC)) other than the radiating element is additionally formed as part of the antenna module 197.

According to various embodiments, the antenna module 197 may form a mmWave antenna module. According to an example, the mmWave antenna module includes a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example, commands or data are transmitted or received between the electronic device 101 and the external electronic device 104 via the server 108 coupled with the second network 199. Each of the electronic devices 102 or 104 may be a device of a same type as, or a different type, from the electronic device 101. According to an example, all or some of operations to be executed at the electronic device 101 are executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another example of the disclosure, the external electronic device 104 includes an internet-of-things (IoT) device. The server 108 may be an intelligent server using machine learning and/or a neural network. According to an example, the external electronic device 104 or the server 108 included in the second network 199. The electronic device 101 may be applied to intelligent services (e.g., smart home, smart city, smart car, or healthcare) based on 5G communication technology or IoT-related technology.

Figure 2:
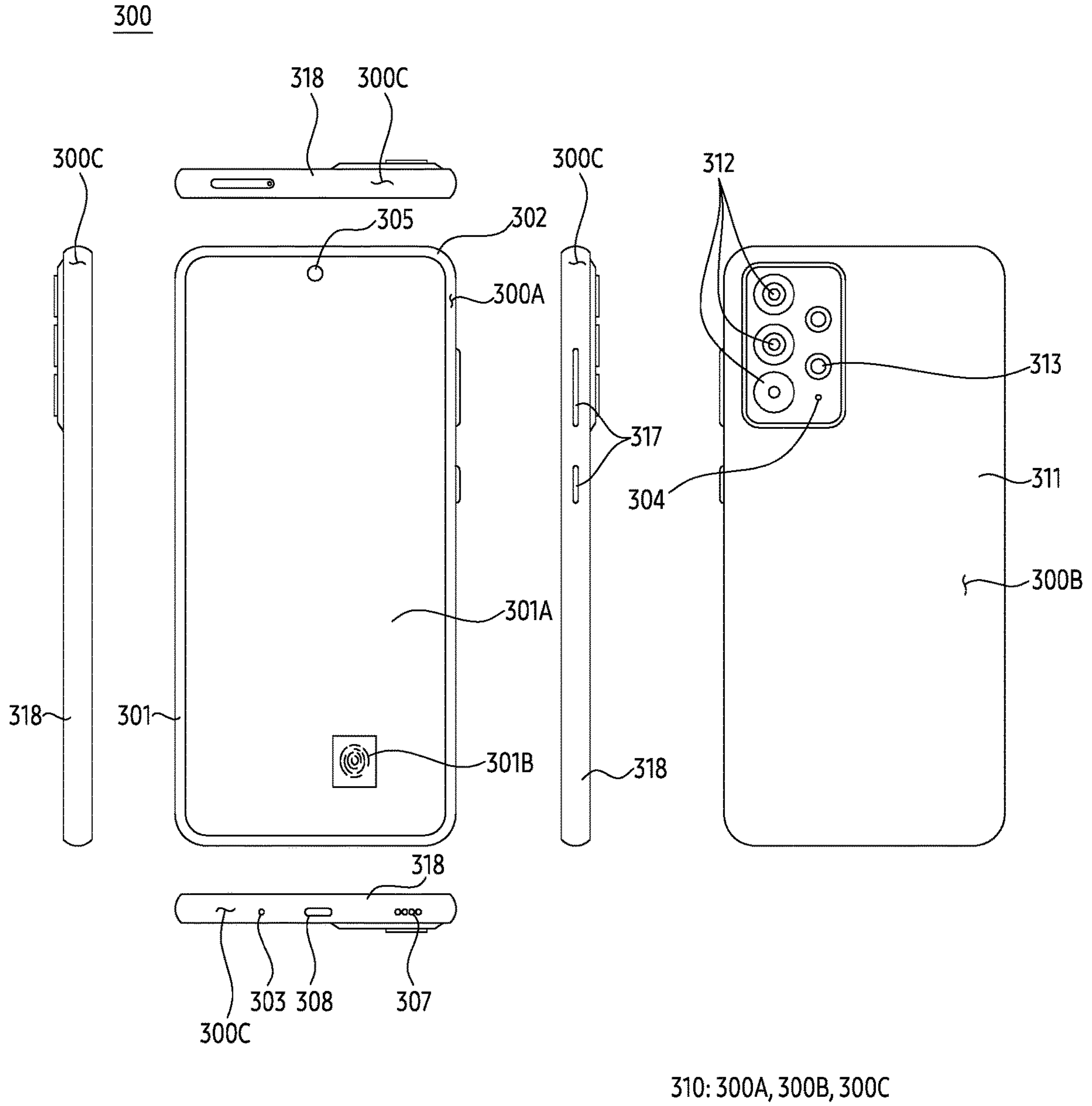
FIG. 2 is a diagram illustrating an electronic device according to an embodiment of the disclosure.

FIG. 2 is a diagram illustrating an electronic device according to an embodiment of the disclosure.

Referring to FIG. 2, an electronic device 300 according to an embodiment may include a housing 310 forming an exterior of the electronic device 300. For example, the housing 310 includes a first surface (or front surface) 300A, a second surface (or rear surface) 300B, and a third surface (or side surface) 300C surrounding a space between the first surface 300A and the second surface 300B. In another embodiment, the housing 310 may refer to a structure forming at least a portion of the first surface 300A, the second surface 300B, and/or the third surface 300C.

The electronic device 300 according to yet another embodiment may include a substantially transparent front plate 302. In yet another embodiment, the front plate 302 may form at least a portion of the first surface 300A. In yet another embodiment, the front plate 302 may include, for example, a glass plate including various coating layers or a polymer plate, but the disclosure is not limited thereto.

The electronic device 300 according to yet another embodiment may include a substantially opaque rear plate 311. In yet another embodiment, the rear plate 311 may form at least a portion of the second surface 300B. In yet another embodiment, the rear plate 311 may be formed of coated or colored glass, ceramic, polymer, metal (e.g., aluminum, stainless steel (STS), or magnesium), or a combination of at least two of the above materials.

The electronic device 300 according to yet another embodiment may include a side bezel structure (or side member) 318. In yet another embodiment, the side bezel structure 318 may be coupled to the front plate 302 and/or the rear plate 311 to form at least a portion of the third surface 300C of the electronic device 300. For example, the side bezel structure 318 forms all of the third surface 300C of the electronic device 300, and for another example, the side bezel structure 318 forms the third surface 300C of the electronic device 300 together with the front plate 302 and/or the rear plate 311.

Unlike the illustrated embodiment, when the third surface 300C of the electronic device 300 is partially formed by the front plate 302 and/or the rear plate 311, the front plate 302 and/or the rear plate 311 may include a region that is bent from its periphery toward the rear plate 311 and/or the front plate 302 and seamlessly extends. The extended region of the front plate 302 and/or the rear plate 311 may be positioned at both ends of, for example, a long edge of the electronic device 300, but is not limited to the above-described examples.

In yet another embodiment, the side bezel structure 318 may include a metal and/or a polymer. In yet another embodiment, the rear plate 311 and the side bezel structure 318 may be integrally formed and may include the same material (e.g., a metal material such as aluminum), but the disclosure are not limited thereto. For example, the rear plate 311 and the side bezel structure 318 are formed in separate configurations and/or may include different materials.

In yet another embodiment, the electronic device 300 may include at least one of a display 301, an audio module 303, 303, 307, a sensor module (not illustrated), a camera module 305, 312, 313, a key input device 317, a light emitting device (not illustrated), and/or a connector hole 308. In yet another embodiment, the electronic device 300 may omit at least one of the components (e.g., a key input device 317 or a light emitting device (not illustrated)), or may further include another component.

In yet another embodiment, the display 301 (e.g., a display module 160 of FIG. 1) may be visually exposed through a substantial portion of the front plate 302. For example, at least a portion of the display 301 is visible through the front plate 302 forming the first surface 300A. In yet another embodiment, the display 301 may be disposed on the rear surface of the front plate 302.

In yet another embodiment, the appearance of the display 301 may be formed substantially the same as the appearance of the front plate 302 adjacent to the display 301. In yet another embodiment, in order to expand the area in which the display 301 is visually exposed, the distance between the outside of the display 301 and the outside of the front plate 302 may be formed to be generally the same.

In yet another embodiment, the display 301 (or the first surface 300A of the electronic device 300) may include a screen display area 301A. In yet another embodiment, the display 301 may provide visual information to a user through the screen display area 301A. In the illustrated embodiment, when the first surface 300A is viewed from the front, it is illustrated that the screen display area 301A is spaced apart from the outside of the first surface 300A and is positioned inside the first surface 300A, but the disclosure is not limited thereto. In yet another embodiment, when the first surface 300A is viewed from the front, at least a portion of the periphery of the screen display area 301A may substantially coincide with the periphery of the first surface 300A (or the front plate 302).

In yet another embodiment, the screen display area 301A may include a sensing area 301B configured to obtain biometric information of a user. Here, the meaning of "the screen display area 301A including the sensing area 3011" may be understood to mean that at least a portion of the sensing area 301B may be overlapped on the screen display area 301A. For example, the sensing area 301B, like other areas of the screen display area 301A, refers to an area in which visual information is displayed by the display 301 and additionally biometric information (e.g., fingerprint) of a user may be obtained. In yet another embodiment, the sensing area 301B may be formed in the key input device 317.

In yet another embodiment, the display 301 may include an area in which the first camera module 305 (e.g., a camera module 180 of FIG. 1) is positioned. In yet another embodiment, an opening may be formed in the area of the display 301, and the first camera module 305 (e.g., a punch hole camera) may be at least partially disposed in the opening to face the first surface 300A. In this case, the screen display area 301A may surround at least a portion of the periphery of the opening. In yet another embodiment, the first camera module 305 (e.g., an under display camera (UDC)) may be disposed under the display 301 to overlap the area of the display 301. In this case, the display 301 may provide visual information to the user through the area, and additionally, the first camera module 305 may obtain an image corresponding to a direction facing the first surface 300A through the area of the display 301.

In yet another embodiment, the display 301 may be coupled to or disposed adjacent to a touch sensing circuit, a pressure sensor capable of measuring the intensity (pressure) of the touch, and/or a digitizer that detects a magnetic field type stylus pen.

In yet another embodiment, the audio modules 303, 303 and 307 (e.g., an audio module 170 of FIG. 1) may include microphone holes 303 and 304, and a speaker hole 307.

In yet another embodiment, the microphone holes 303 and 304 may include a first microphone hole 303 formed in a partial area of the third surface 300C and a second microphone hole 304 formed in a partial area of the second surface 300B. A microphone (not illustrated) for obtaining an external sound may be disposed inside the microphone holes 303 and 304. The microphone may include a plurality of microphones to detect the direction of sound.

In yet another embodiment, the second microphone hole 304 formed in a partial area of the second surface 300B may be disposed adjacent to the camera modules 305, 312 and 313. For example, the second microphone hole 304 obtains sound according to operations of the camera modules 305, 312, and 313. However, the disclosure is not limited thereto.

In yet another embodiment, the speaker hole 307 may include an external speaker hole 307 and a receiver hole (not illustrated) for a call. The external speaker hole 307 may be formed on a portion of the third surface 300C of the electronic device 300. In yet another embodiment, the external speaker hole 307 may be implemented as a single hole together with the microphone hole 303. Although not illustrated, a receiver hole (not illustrated) for a call may be formed on another portion of the third surface 300C. For example, the receiver hole for a call is formed on the opposite side of the external speaker hole 307 on the third surface 300C. For example, with respect to the illustration of FIG. 3, the external speaker hole 307 is formed on the third surface 300C corresponding to the lower end of the electronic device 300, and the receiver hole for a call may be formed on the third surface 300C corresponding to the upper end of the electronic device 300. However, the disclosure is not limited thereto, and in yet another embodiment, the receiver hole for a call may be formed at a position other than the third surface 300C. For example, the receiver hole for a call is formed by a space spaced apart between the front plate 302 (or display 301) and the side bezel structure 318.

In yet another embodiment, the electronic device 300 may include at least one speaker (not illustrated) configured to output sound to the outside of the housing 310 through an external speaker hole 307 and/or a receiver hole (not illustrated) for a call.

In yet another embodiment, the sensor module (not illustrated) (e.g., a sensor module 176 of FIG. 1) may generate an electrical signal or data value corresponding to an internal operating state or an external environmental state of the electronic device 300. For example, the sensor module includes at least one of a proximity sensor, a heart rate monitor (HRM) sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

In yet another embodiment, the camera modules 305, 312 and 313 (e.g., a camera module 180 of FIG. 1) may include a first camera module 305 disposed to face the first surface 300A of the electronic device 300, a second camera module 312 disposed to face the second surface 300B, and a flash 313.

In yet another embodiment, the second camera module 312 may include a plurality of cameras (e.g., a dual camera, a triple camera, or a quad camera). However, the second camera module 312 is not necessarily limited to including a plurality of cameras, and may include one camera.

In an embodiment, the first camera module 305 and the second camera module 312 may include one or a plurality of lenses, an image sensor, and/or an image signal processor.

In yet another embodiment, the flash 313 may include, for example, a light emitting diode (LED) or a xenon lamp. In another embodiment, two or more lenses (infrared camera, wide-angle and telephoto lens) and image sensors may be disposed on one side of the electronic device 300.

In yet another embodiment, the key input device 317 (e.g., an input module 150 of FIG. 1) may be disposed on the third surface 300C of the electronic device 300. In yet another embodiment, the electronic device 300 may not include some or all of the key input devices 317, and the key input device 317 not included therein may be implemented on the display 301 in another form such as a soft key.

In yet another embodiment, the connector hole 308 may be formed on the third surface 300C of the electronic device 300 to accommodate the connector of the external device. A connection terminal (e.g., a connection terminal 178 of FIG. 1) electrically connected to the connector of the external device may be disposed in the connector hole 308. The electronic device 300 according to yet another embodiment may include an interface module (e.g., an interface 177 of FIG. 1) for processing electrical signals transmitted and received through the connection terminal.

In yet another embodiment, the electronic device 300 may include a light emitting device (not illustrated). For example, the light emitting device (not illustrated) is disposed on the first surface 300A of the housing 310. The light emitting device (not illustrated) may provide state information of the electronic device 300 in a form of light. In yet another embodiment, the light emitting device (not illustrated) may provide a light source when the first camera module 305 is operated. For example, the light emitting device (not illustrated) includes an LED, an IR LED, and/or a xenon lamp.

Figure 3:
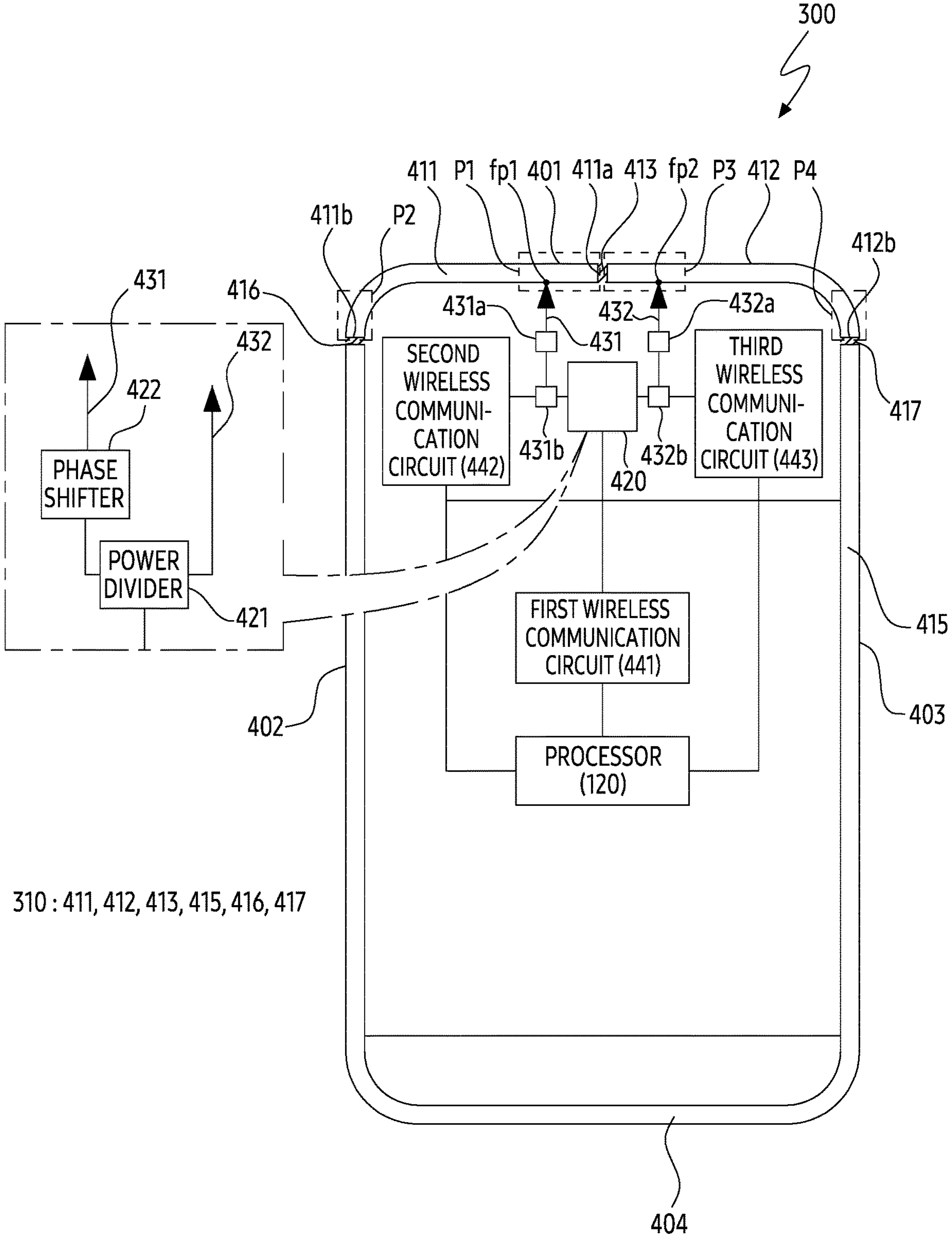
FIG. 3 is a schematic diagram illustrating components for supplying power to a first conductive portion or a second conductive portion of an electronic device, according to an embodiment of the disclosure.

FIG. 3 is a schematic diagram illustrating components for feeding power to a first conductive portion or a second conductive portion of an electronic device, according to an embodiment of the disclosure.

Referring to FIG. 3, the electronic device 300 may include an antenna capable of communicating with an external electronic device, when it is used in a communication shaded area such as e.g., mountain or remote area, ocean, or polar area, where it is difficult to build a base station. For example, the external electronic device is a low-orbit communication satellite (e.g., satelloid). Such a low-orbit satellite may be, for example, a satellite orbiting approximately 200 to 1000 km above the ground portion. The electronic device 300 may utilize such a low-orbit satellite as a base station. The electronic device 300 may perform wireless communication even in most remote areas via the low-orbit satellite. The electronic device 300 may include an antenna having directivity for communication with the low-orbit satellites. In order to obtain high directivity, the electronic device 300 may have an external antenna protruding to the outside, but miniaturization trends of the electronic device 300 may require an antenna structure that does not protrude to the outside. Hereinafter, description will be made of the structure and operation of an antenna capable of communicating with a satellite communication system, while maintaining the appearance of the electronic device 300.

Referring to FIG. 3, the electronic device 300 according to an embodiment may include a housing 310, a power distribution circuit 420, wireless communication circuits 441, 442, and 443, and/or a processor 120.

According to an embodiment, the housing 310 may include a first side surface 401, a second edge 402, a third side surface 403, and a fourth side surface 404. The first side surface 401 may connect one end of the second edge 402 and one end of the third side surface 403. The second edge 402 may extend from one end of the first side surface 401 in a direction perpendicular to the first side surface 401. The third side surface 403 may extend from the other end of the first side surface 401 in a direction parallel to the second side surface 402. The fourth side surface 404 may be parallel to the first side surface 401 and connect the other end of the second side surface 402 and the other end of the third side surface 403.

According to an embodiment, at least a portion of a first conductive portion 411 and at least a portion of the second conductive portion 412 may be disposed on the first side surface 401 closer to the camera (e.g., the first camera module 305 of FIG. 2) than the fourth side surface 404. The camera module 305 may be configured to acquire an image through a portion of a surface on which a display (e.g., the display 301 of FIG. 2) is disposed.

According to an embodiment, at least a portion of a first conductive portion 411 and at least a portion of the second conductive portion 412 may be disposed on the first side surface 401 close to the horizontal line where a scan of the display 301 begins than on the fourth side surface 404.

According to an embodiment, the housing 310 may include a first conductive portion 411, a second conductive portion 412, a first non-conductive portion 413, a third conductive portion 415, a second non-conductive portion 416, and/or a third non-conductive portion 417. For example, the first conductive portion 411 is disposed along respective parts of the first side surface 401 and the second side surface 402 of the housing 310. For example, the second conductive portion 412 is disposed along parts of the first side surface 401 and the third side surface 403 of the housing 310. For example, the third conductive portion 415 is disposed on a remaining edge part except for the first conductive portion 411 and the second conductive portion 412.

According to an embodiment, the first non-conductive portion 413 may be disposed between the first conductive portion 411 and the second conductive portion 412. The first non-conductive portion 413 may be referred to as a segmented portion in a side including the first conductive portion 411 and the second conductive portion 412. For example, the second non-conductive portion 416 is disposed between the first conductive portion 411 and the third conductive portion 415. For example, the third non-conductive portion 417 is disposed between the second conductive portion 412 and the third conductive portion 415.

According to an embodiment, the third conductive portion 415 is illustrated as one conductive portion, but the disclosure not limited thereto. The third conductive portion 415 may include a plurality of conductive portions. A plurality of non-conductive portions may be disposed between the plurality of conductive portions.

According to an embodiment, at least parts of the first conductive portion 411, the second conductive portion 412, and the third conductive portion 417 may operate as an antenna radiator. For example, the first conductive portion 411, the second conductive portion 412, or the third conductive portion 417 operates as an antenna radiator capable of supporting, e.g., Wi-Fi, global positioning system (GPS), or long term evolution (LTE) communications. According to yet another embodiment, the first conductive portion 411 and the second conductive portion 412 may operate as antenna radiators capable of supporting satellite communication. For example, the first conductive portion 411 operates as an antenna radiator supporting GPS communication, and may operate as an antenna radiator supporting satellite communication together with the second conductive portion 412. For example, the first conductive portion 411 operates as an antenna radiator together with the second conductive portion 412 to increase the directivity to support the satellite communication.

According to an embodiment, the first conductive portion 411 may include a first portion P1 including a first end 411*a* close to the first non-conductive portion 413, and a second end 411*b* close to the second non-conductive portion 416. The second conductive portion 412 may include a third portion P3 including a third end 412*a* close to the first non-conductive portion 413, and a fourth end 412*b* close to the third non-conductive portion 417. The first conductive portion 411 may be supplied with power through the first portion P1, and the second conductive portion 412 may be supplied with power through the third portion P3. For example, a first feeding point fp1 is disposed in the first portion P1, and a second feeding point fp2 is disposed in the third portion P3.

According to an embodiment, the power distribution circuit 420 may be electrically connected to the first portion P1 and the third portion P3. For example, the power distribution circuit 420 is electrically connected to the first portion P1 among the first portion P1 and the second portion P2 of the first conductive portion 411. The power distribution circuit 420 may be electrically connected to the first feeding point fp1. The power distribution circuit 420 may be electrically connected to the third portion P3 among the third portion P3 and the fourth portion P4 of the second conductive portion 412. The power distribution circuit 420 may be electrically connected to the second feeding point fp2.

According to an embodiment, the power distribution circuit 420 may include a power divider 421 and a phase shifter 422. The power divider 421 may distribute the power supplied to the power distribution circuit 420 to the first conductive portion 411 and the second conductive portion 412. The power divider 421 may transmit a first signal transmitted to the power distribution circuit 420 to the first conductive portion 411 and the second conductive portion 412. For example, the power divider 421 supplies a second power (or a first transmission power) distributed from the first power supplied to the power distribution circuit 420, to the first conductive portion 411. The power divider 421 may supply a second signal (or a first distribution signal) distributed from the first signal supplied to the power distribution circuit 420, to the first conductive portion 411 as the second power. The power divider 421 may supply a third power (or a second transmission power) distributed from the power supplied to the power distribution circuit 420, to the second conductive portion 412. The power divider 421 may supply a third signal (or a second distribution signal) distributed from the first signal supplied to the power distribution circuit 420, to the second conductive portion 412 as the third power. For example, the power divider 421 includes a Wilkinson power divider.

According to an embodiment, the first conductive portion 411 and the second conductive portion 412 may receive the second signal and the third signal from the power divider 421 and transmit the first signal to the outside, respectively. For example, the second signal radiated from the first conductive portion 411 and the third signal radiated from the third signal are combined and radiated to the outside. When transmitting the same signal through the first conductive portion 411 and the second conductive portion 412, a distance between the first conductive portion 411 and the second conductive portion 412 may require a half-wavelength of the first signal in order to increase its directivity. For example, in order to improve the directivity of the first signal, the third signal or the third signal with approximately 1.6 gigahertz (GHz), the first conductive portion 411 and the second conductive portion 412 require a separation distance of about 9.35 cm, which is a half-wavelength of the first signal.

According to an embodiment, the electronic device 300 may not have enough space to space a gap between the first conductive portion 411 and the second conductive portion 412 apart by the half-wavelength of the first signal, the second signal, or the third signal. Due to such an insufficient space in the electronic device 300, the distance between the first conductive portion 411 and the second conductive portion 412 or the width of the first non-conductive portion 413 may be shorter than the half-wavelength of the first signal, the second signal, or the third signal transmitted to the first conductive portion 411 and the second conductive portion 412. In one embodiment, the electronic device 300 may further include a phase shifter 422 in order to improve the directivity of the first signal transmitted to the outside via the first conductive portion 411 and the second conductive portion 412, which are spaced apart by a separation distance shorter than the half-wavelength of the first signal, the second signal, or the third signal. The power divider 421 may be electrically connected to the first portion P1 of the first conductive portion 411 through a phase shifter 422.

According to an embodiment, the phase shifter 422 may include a plurality of passive elements (e.g., inductors or capacitors). The phase shifter 422 may convert the phase of the input second signal. The phase shifter 422 may be disposed between the power divider 421 and the first conductive portion 411. The phase shifter 422 may be connected to the first portion P1 of the first conductive portion 411. The phase shifter 422 may convert the phase of the second signal transmitted to the first portion P1 to a phase different from that of the third signal transmitted to the third portion P3. According to an embodiment, the second signal radiated from the first conductive portion 411 may have a second power divided by the power divider 421 from the first power and a second phase for a directivity according to radiating the second signal and the third signal. A third signal radiated from the second conductive portion 412 may have a first phase and third power divided from the first power by the power divider. The second phase may be shifted from the first phase by the phase shifter 422. Although the phase shifter 422 has been described as being electrically connected to the first portion P1 of the first conductive portion 411, it is not limited thereto. For example, the phase shifter 422 may be electrically connected to the third portion P3 of the second conductive portion 412. The phase shifter 422 electrically connected to the second conductive portion 412 may convert the phase of the third signal transmitted to the third portion P3 to a phase different from that of the second signal transmitted to the first portion P1. According to an embodiment, the second signal radiated from the first conductive portion 411 may have a second power divided by the power divider 421 from the first power and a first phase. A third signal radiated from the second conductive portion 412 may have a second phase for a directivity according to radiating the second signal and the third signal and third power divided from the first power by the power divider. The second phase may be shifted from the first phase by the phase shifter 422. For example, a plurality of phase shifters 422 is provided. For example, one of the phase shifters may be connected to the first portion P1, and another of the phase shifters are connected to the third portion P3. The first signal transmitted from the first wireless communication circuit 441 may be transmitted to the first portion P1 and the third portion P3 with different phases through the phase shifters. The phase shifters may have different passive elements. Through the phase shifter disposed on the line 431 and the phase shifter disposed on the line 432, a signal transmitted to the first conductive portion 411 and a signal transmitted to the second conductive portion 412 may have different phase. The first phase and the second phase may be different from each other through a phase shifter (or phase shifters). According to the frequency bands of the second signal and the third signal, a difference between the first phase and the second phase may be between 0 degrees and 360 degrees. For example, a difference between the first phase and the second phase may be approximately 40 degrees to 60 degrees. When the frequency of the second signal or the third signal is approximately 1.6 GHz, a difference between the first phase and the second phase may be approximately 46 degrees due to the phase shifter 422.

According to an embodiment, the processor 120 may transmit each of the same signals with different phases through the first conductive portion 411 and the second conductive portion 412. The processor 120 may include at least one of the processor 120 of FIG. 1, an application processor, a communication processor, a transceiver, or an RFIC. For example, the processor 120 is configured to transmit the second signal distributed from the first signal provided from the first wireless communication circuit 441 to the power divider 421, via the first conductive portion 411. According to an embodiment, while the second signal having the first phase is transmitted, the processor 120 may be configured to transmit the third signal having a second phase different from the first phase, to an external electronic device through the second conductive portion 412 with the third power distributed from the power. For example, the external electronic device is a satellite or a base station for long-distance communications. In order to communicate with an external electronic device as in a satellite communication, the electronic device 300 may be configured to increase the directivity of the first signal transmitted from the first conductive portion 411 and the second conductive portion 412 to a satellite. The processor 120 may be configured to transmit, via the first wireless communication circuit 441, the second signal having the first phase converted by the phase shifter 422, to the external electronic device through the first conductive portion 411 with the second power. The processor 120 may be configured to transmit the third signal having a second phase different from the first phase, to the second conductive portion 412, via the first wireless communication circuit 441 and the phase shifter 422. A signal obtained by synthesizing a second signal transmitted to the outside through the first conductive portion 411 spaced apart shorter than a half wavelength of the first signal and a third signal transmitted to the outside through the second conductive portion 412 may have more increased directivity.

According to an embodiment, the processor 120 may be operatively connected to the first wireless communication circuit 441, the second wireless communication circuit 442, and the third wireless communication circuit 443. The first wireless communication circuit 441, the second wireless communication circuit 442, or the third wireless communication circuit 443 may include a communication processor, a radio frequency integrated chip, a radio frequency front end (RFFE), or front end module (FEM). The first wireless communication circuit 441 may be configured to transmit the signal obtained by synthesizing the second signal and the third signal to the first external electronic device through the first conductive portion 411 and the second conductive portion 412. According to one embodiment, the first wireless communication circuit 441 may be configured to provide a first signal having a first phase and a first power, to radiate a second signal from the first conductive portion 411 and to radiate a third signal from the second conductive portion 412 while the second signal is radiated from the first conductive portion 411. The first wireless communication circuit 441 may be electrically connected to a first line 431 connected to the first portion P1 and a second line 432 connected to the third portion P3. For example, the first wireless communication circuit 441 is electrically connected to the power distribution circuit 420 through a connecting point fs. The first wireless communication circuit 441 may be electrically connected to the first line 431 and the second line 432 via the power distribution circuit 420. The first wireless communication circuit 441 may be fed to the first feeding point fp1 of the first conductive portion 411 through the power distribution circuit 420 and the first line 431, and fed to the second feeding point fp2 of the second conductive portion 412 through the power distribution circuit 420 and the second line 432. According to an embodiment, the first wireless communication circuit 441 may be integrally formed with the power distribution circuit 420. For example, a power distribution circuit may be disposed on a substrate, and a first wireless communication circuit 441 that is CP or FEM is disposed on the substrate. The first wireless communication circuit 441, the power divider 421, and the phase shifter 422 may be disposed on one substrate. The second wireless communication circuit 442 may be electrically connected to the first line 431 connected to the first portion P1. The electronic device 300 may further include a first matching circuit 431*a* disposed on the first line 431, and a first line selection circuit 431*b* between the second wireless communication circuit 442 and the power distribution circuit 420 both of which are connected to the first line 431. For example, the second wireless communication circuit 442 is electrically connected to the first line 431 via a point f1. The second wireless communication circuit 442 may fed to the first feeding point fp1 of the first conductive portion 411, via the first line 431. The third wireless communication circuit 443 may be electrically connected to a second line 432 connected to the third portion P3. The electronic device 300 may further include a second matching circuit 432*a* disposed on the second line 432, and a second line selection circuit 432*b* between the power distribution circuit 420 and the third wireless communication circuit 443 being connected to the second line 432. For example, the third wireless communication circuit 443 is electrically connected to the second line 432 via a point f2. The third wireless communication circuit 443 may fed to the second feeding point fp2 of the second conductive portion 412 via the second line 432. The first wireless communication circuit 441 may transmit, via the power distribution circuit 420, the second signal that is the first signal having the first phase, to the first portion P1 with the second power, and transmit the second signal that is the first signal having the second phase, to the third portion P3 with the third power. The second signal and the third signal may include the same information as the first signal, and the phases of the second signal and the third signal may be different from each other. The second wireless communication circuit 442 may transmit a fourth signal different from the first signal, the second signal and/or the third signal to the first portion P1. The third wireless communication circuit 443 may transmit a fifth signal different from the first signal, the second signal the third signal and/or the fourth signal, to the second portion P2. According to an embodiment, the processor 120 may be configured to transmit the fourth signal from the second wireless communication circuit 442 via the first conductive portion 411 to the second external electronic device distinct from the first external electronic device. The processor 120 may be configured to transmit the third signal from the third wireless communication circuit 443 through the second conductive portion 412 to a third external electronic device distinct from the first external electronic device.

According to an embodiment, the processor 120 may be configured to provide to a first state of communicating the signal obtained by synthesizing the second signal and the third signal with the first external electronic device (e.g., a satellite) through the first conductive portion 411 and the second conductive portion 412, or a second state of communicating the second signal from the second wireless communication circuit 442 with the second external electronic device via the first conductive portion 411 or communicating the fifth signal from the third wireless communication circuit 443 with the third external electronic device via the second conductive portion 4120. In an embodiment, the processor 120 may be configured to cause the second wireless communication circuit 442 and the third wireless communication circuit 443 to be inactive, based on activation of the first wireless communication circuit 441. For example, the processor 120 is configured to deactivate the second wireless communication circuit 442 and the third wireless communication circuit 443 while it is in the first state. For example, while the second signal is radiated through the first conductive portion 411 and the third signal is radiated through the second conductive portion 412, the second wireless communication circuit 442 and/or the third wireless communication circuit 443 may be configured to be inactive. The processor 120 may be configured to cause the first wireless communication circuit 441 to be inactive while in the second state. The first wireless communication circuit 441 may be configured to be inactive, while the second wireless communication circuit 442 or the third wireless communication circuit 443 is active. The first wireless communication circuit 441 may be configured to be inactive while the fourth signal is radiated through the first conductive portion 411 or the fifth signal is radiated through the second conductive portion 412.

According to yet another embodiment, the electronic device 300 may include a matching circuit 431*a* or 432*a*. The first matching circuit 431*a* may be disposed between the first feeding point fp1 and the first line selection circuit 431*b*. The second matching circuit 432*a* may be disposed between the second feeding point fp2 and the second line selection circuit 432*b*. The first conductive portion 411 connected to the first line 431 may be matched through the first matching circuit 431*a*. The second conductive portion 412 connected to the second line 432 may be matched through the second matching circuit 432*a*.

According to yet another embodiment, the electronic device 300 may include the line selection circuit 431*b* or 432*b*. The first line selection circuit 431*b* and the second line selection circuit 432*b* may be a filter. The filter may be a diplexer. For example, the first line selection circuit 431*b* is located on a path connecting the second wireless communication circuit 442 and the first portion P1. For example, the second line selection circuit 432*b* is located on a path connecting the third wireless communication circuit 443 and the third portion P3. The first line selection circuit 431*b*, which is a filter, may block at least part of the second signal transmitted to the first conductive portion 411 through the second wireless communication circuit 442. According to yet another embodiment, the processor 120 may block at least part of the second signal transmitted to the first conductive portion 411 through the first line selection circuit 431*b*, while the first state of transmitting the first signal to the external electronic device is maintained. According to yet another embodiment, the processor 120 may be configured to block at least part of the third signal transmitted to the second conductive portion through the second line selection circuit 432*b*, while the first state is maintained. The second line selection circuit 432*b* may block at least part of the third signal transmitted to the second conductive portion 412 through the third wireless communication circuit 443. Although the first line selection circuit 431*b* and the second line selection circuit 432*b* have been described as including a filter, the disclosure is not limited thereto. The filter may be replaced with a switch. For example, the electronic device 300 includes a first switch and a second switch. The first switch may connect the first wireless communication circuit 441 or the second wireless communication circuit 442 to the first portion P1. The second switch may connect the first wireless communication circuit 441 or the third wireless communication circuit 443 to the second portion P2. While the first state of transmitting the first signal to the external electronic device through the first wireless communication circuit 441, the processor 120 may be configured to electrically connect the first wireless communication circuit 441, among the first wireless communication circuit 441 and the second wireless communication circuit 442, to the first portion P1, via the first switch that is the first line selection circuit 431*b*, and electrically connect the first wireless communication circuit 441, among the first wireless communication circuit 441 and the third wireless communication circuit 443, to the second portion P2, via the second switch that is the second line selection circuit 432*b*. While it is maintained the second state of communicating the second signal from the second wireless communication circuit 442 through the first conductive portion 411 with the second external electronic device or communicating the third signal from the third wireless communication circuit 443 through the second conductive portion 412 with the third external electronic device, the processor 120 may be configured to electrically connect the second wireless communication circuit 442, among the first wireless communication circuit 441 and the second wireless communication circuit 442, to the first portion P1, via the first switch that is the first line selection circuit 431*b*, and electrically connect the third wireless communication circuit 443, among the first wireless communication circuit 441 and the third wireless communication circuit 443, to the second portion P2, via the second switch that is the second line selection circuit 432*b*.

According to the above-described embodiment, the electronic device 300 can increase the directivity of a signal transmitted from the antenna radiator in order to communicate with a long-distance external electronic device such as a satellite, etc. According to yet another embodiment, the electronic device 300 makes it possible to overcome spatial limitation in the first conductive portion 411 and the second conductive portion 412, forming a housing 310 of the electronic device 300, which require a half-wavelength separation distance of the signal. In the electronic device 300, the phase shifter 422 enables the first phase of the second signal transmitted to the first conductive portion 411 and the second phase of the third signal transmitted to the second conductive portion 412 to be different from each other. The signals of different phases can generate constructive interference with each other. The electronic device 300 may transmit a first signal with a first phase to the first conductive portion 411 and a first signal with a second phase to the second conductive portion 412, with a phase difference causing such a constructive interference. The second signal and the third signal may cause the constructive interference with each other, thereby leading to having the directivity in a direction perpendicular to the first side surface 401 of the electronic device 300. For example, a composite signal of a second signal radiated from the first conductive portion 411 and a third signal radiated from the second conductive portion 412 may be transmitted in a direction perpendicular to the first side surface 411.

Figure 4:
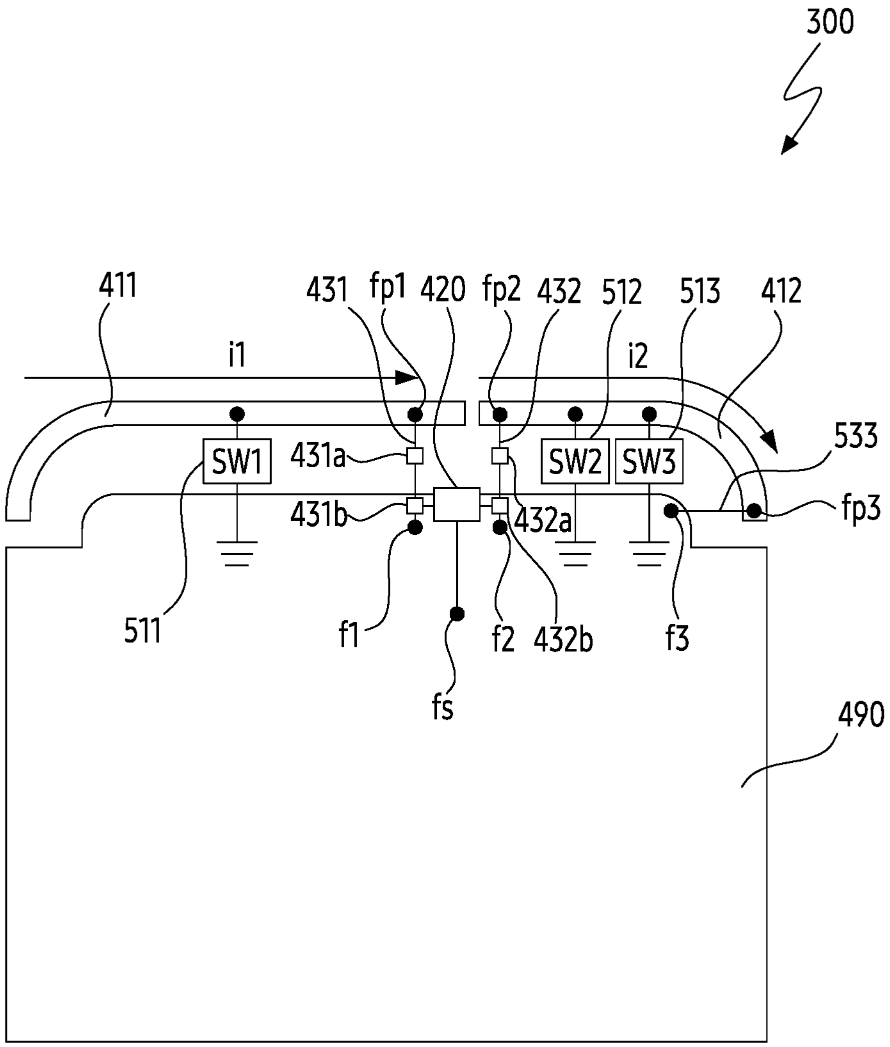
FIG. 4 shows an example of connection between a ground portion and a first conductive portion or a second conductive portion of an electronic device, according to an embodiment of the disclosure.

FIG. 4 shows an example of connection between a ground portion and a first conductive portion or a second conductive portion of an electronic device according to an embodiment of the disclosure.

Figure 5:
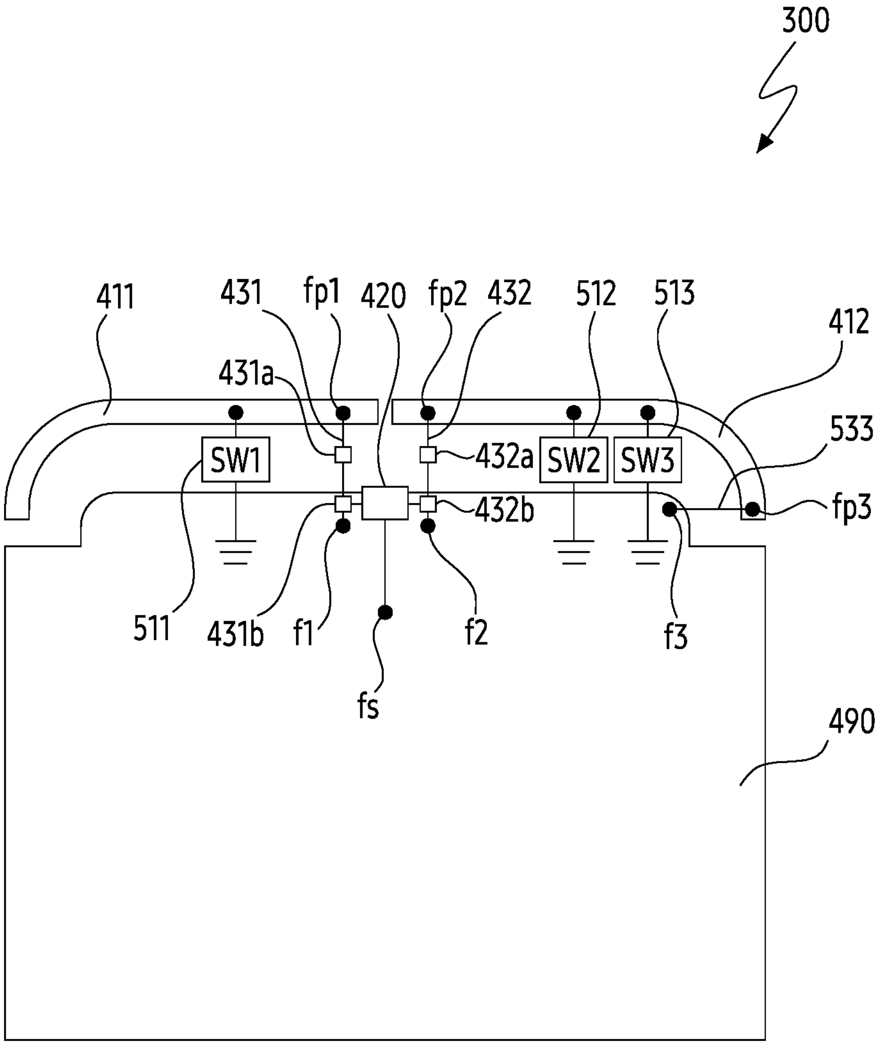
FIG. 5 shows an example of connection between a ground portion and a first conductive portion or a second conductive portion symmetrical to the first conductive portion of an electronic device, according to an embodiment of the disclosure.

FIG. 5 shows an example of connection between a ground portion and a first conductive portion or a second conductive portion symmetrical to the first conductive portion of an electronic device, according to an embodiment of the disclosure.

Referring to FIGS. 4 and 5, the electronic device 300 may further include a ground portion 490. The ground portion 490 may be disposed in the housing 210 (e.g., the housing 310 of FIG. 2). The ground portion 490 may be spaced apart from the first conductive portion 411 and the second conductive portion 412. According to an embodiment, the first conductive portion 411 and the second conductive portion 412 may be selectively connected to the ground portion 490 by means of a plurality of switches 511, 512, and/or 513. In another embodiment, the electronic device 300 may include a first switch 511, a second switch 512, and/or a third switch 513. For example, the first switch 511 is disposed between the first conductive portion 411 and the ground portion 490. For example, in the first state of communicating with the first external electronic device (e.g., an satellite), the first switch 511 is electrically open the first conductive portion 411 and the ground portion 490. The first switch 511 may disconnect the first conductive portion 411 and the ground portion 490 while the second signal having the first phase is radiated through the first conductive portion 411. For example, in the second state of communicating with the second external electronic device or the third external electronic device, the first switch 511 electrically connects the first conductive portion 411 to the ground portion 490.

According to an embodiment, the second switch 512 and/or the third switch 513 may be positioned between the second conductive portion 412 and the ground portion. For example, in the first state, the second switch 512 and the third switch 513 are electrically open the second conductive portion 412 and the ground portion 490. The second switch 512 and the third switch 513 may be disconnected the second conductive portion 411 and the ground portion 490 while the second signal having the first phase is radiated through the second conductive portion 412. For example, in the second state, the second switch 512 and the third switch 513 electrically connect the second conductive portion 412 and the ground portion 490.

According to an embodiment, in the first state, the first switch 511, the second switch 512, and/or the third switch 513 may be electrically opened. For example, with the opening of the first switch 511, the second switch 512, and the third switch 513, the first conductive portion 411 are electrically disconnected from the ground portion 490, and the second conductive portion 412 may be electrically disconnected from the ground portion 490. The first conductive portion 411 and the second conductive portion 412 may operate similarly to a radiator of a dipole antenna. The first signal transmitted from the first wireless communication circuit (e.g., the first wireless communication circuit 441 of FIG. 3) may be fed to the first conductive portion 411 and the second conductive portion 412 via the power distribution circuit 420. For example, the first wireless communication circuit 441 is electrically connected to the power distribution circuit 420 via the connecting point fs. The first wireless communication circuit 441 may fed to the first feeding point fp1 of the first conductive portion 411 and the second feeding point fp2 of the second conductive portion 412, via the power distribution circuit 420. For example, the first conductive portion 411 and the second conductive portion 412 operate as an antenna radiator by currents i1 and i2 flowing in the same direction. For example, based on radiation currents i1 and i2 flowing in the same direction, the first conductive portion 411 and the second conductive portion 412 serving as a radiator operate as a dipole antenna.

According to an embodiment, the electronic device 300 may further include a first matching circuit 431*a* disposed on the first line 431, and a first line selection circuit 431*b* between the power distribution circuit 420 and the second wireless communication circuit 442 connected to the first line 431. For example, the second wireless communication circuit 442 is electrically connected to the first line 431 through the connecting point f1. The second wireless communication circuit 442 may be fed to the first feeding point fp1 of the first conductive portion 411 through the first line 431. The first line selection circuit 431*b* may transmit one of a first signal transmitted from the first wireless communication circuit 441 and a second signal transmitted from the second wireless communication circuit 442, to the first conductive portion 411. The first matching circuit 431*a* may be disposed between the first feeding point fp1 and the first line selection circuit 431*b*. The first conductive portion 411 connected to the first line 431 may be matched by means of the first matching circuit 431*a*. The electronic device 300 may further include a second matching circuit 432*a* disposed on the second line 432, and a second line selection circuit 432*b* between the power distribution circuit 420 and the third wireless communication circuit 443 connected to the second line 432. For example, the third wireless communication circuit 443 is electrically connected to the second line 432 through the connecting point f2. The third wireless communication circuit 443 may be fed to the second feeding point fp2 of the second conductive portion 412 through the second line 432. The second line selection circuit 432*b* may transmit one of the first signal transmitted from the first wireless communication circuit 441 and the third signal transmitted from the third wireless communication circuit 443, to the second conductive portion 412. The second matching circuit 432*a* may be disposed between the second feeding point fp2 and the second line selection circuit 432*b*. The second conductive portion 412 connected to the second line 432 may be matched through the second matching circuit 432*a*.

According to an embodiment, in the second state, at least some of the first switch 511, the second switch 512, and/or the third switch 513 may be closed. Such a closing may mean that the ground portion 490 and the radiator (e.g., the first conductive portion 411 or the second conductive portion 412) are short-circuited or connected to each other. The first switch 511, the second switch 512, and/or the third switch 513 may include a variable component capable of adjusting impedance in addition to opening or short-circuiting any two circuit points. According to an embodiment, the first switch 511, the second switch 512, and/or the third switch 513 may be opened in the first state of transmitting the first signal transmitted from the first wireless communication circuit 441 to the outside. For example, the first conductive portion 411 and the second conductive portion 412 electrically disconnected from the ground portion 490 operate as a dipole antenna. In the second state of transmitting the second signal or the third signal to the third external electronic device, the first switch 511, the second switch 512, and/or the third switch 513 may operate as a variable component for impedance adjustment. For example, the first switch 511 adjusts the impedance to correspond to a resonance frequency of the second signal transmitted through the first conductive portion 411, and the second switch 512 and/or the third switch 513 may adjust the impedance to correspond to a resonance frequency of the third signal transmitted through the second conductive portion 412.

According to the closing of at least some of the first switch 511, the second switch 512, and/or the third switch 513, the first conductive portion 411 may be electrically connected to the ground portion 490 or the second conductive portion 412 may be electrically connected to the ground portion 490.

According to an embodiment, the first conductive portion 411 and the second conductive portion 412 may operate as an antenna radiator that transmits signals of different frequencies to an external electronic device, respectively. Through the first feeding point fp1, the second signal from the second wireless communication circuit (e.g., the second wireless communication circuit 442 of FIG. 3) may be fed to the first conductive portion 411. For example, the second wireless communication circuit 442 is electrically connected to the first line 431 through the point f1. The second wireless communication circuit 442 may be fed to the first feeding point fp1 of the first conductive portion 411, via the first line 431. The third signal from the third wireless communication circuit (e.g., the third wireless communication circuit 443 of FIG. 3) may be fed to the second conductive portion 412 via the second feeding point fp2. For example, the third wireless communication circuit 443 is electrically connected to the second line 432 connected to the third portion P3. For example, the third wireless communication circuit 443 is electrically connected to the second line 432 through a point f2. The third wireless communication circuit 443 may be fed to the second feeding point fp2 of the second conductive portion 412, via the second line 432. The fourth signal may be fed to the second conductive portion 412 via the third feeding point fp3 connected to the third line 533 from the third wireless communication circuit 443 or another wireless communication circuit. For example, the third wireless communication circuit 443 or another wireless communication circuit is connected to the point f3 to feed the fourth signal to the third feeding point fp3 of the second conductive portion 412 via the third line 533.

According to an embodiment, the first switch 511, the second switch 512, and the third switch 513 may short-circuit between the first conductive portion 411 and the ground portion 490, and short-circuit between the second conductive portion 412 and the ground portion 490. The first conductive portion 411 or the second conductive portion 412 short-circuited with the ground portion may operate as an antenna supporting a legacy network (e.g., the first cellular network 292 in FIG. 2). In one embodiment, the first switch 511, the second switch 512, and the third switch 513 may be configured to isolate antenna radiators (e.g., the first conductive portion 411 and the second conductive portion 412). For example, the second switch 512 and the third switch 513 connected to the ground portion 490 isolates signals supplied to the second feeding point fp2 and the third feeding point fp3.

According to an embodiment, the processor 120 (e.g., the processor 120 in FIG. 2) may be configured to electrically disconnect the ground portion 490 and the first conductive portion 411, through the first switch 511, while the second signal having the first phase is transmitted through the first wireless communication circuit 441 (e.g., the first wireless communication circuit 441 in FIG. 4). The second signal may be the first signal converted into the first phase through the phase shifter (e.g., the phase shifter 422 of FIG. 4). According to yet another embodiment, the processor 120 may be configured to electrically disconnect the second conductive portion 412 and the ground portion 490, through the second switch 512 and the third switch 513, while the third signal having the second phase is transmitted through the first wireless communication circuit 441. The third signal may be the first signal having the second phase that is the same phase as the phase of the first signal transmitted to the power distribution circuit 420. For another example, the third signal is the first signal converted to the second phase different from the phase the first signal transmitted to the power distribution circuit 420, via another phase shifter distinct from the phase shifter 422, the second phase being different from the first phase.

According to an embodiment, the processor 120 may be configured to turn on/off the switches 511, 512, and 513 according to a communication state with an external electronic device (e.g., a first state or a second state). For example, in the first state, the processor 120 controls the first conductive portion 411 and the second conductive portion 412 to operate substantially as a dipole antenna by opening the first switch 511, the second switch 512, and the third switch 513. For example, in the second state, the processor 120 controls each of the first conductive portion 411 and the second conductive portion 412 to operate as an antenna radiator by short-circuiting the first switch 511, the second switch 512, and the third switch 513.

According to the above-described embodiment, the electronic device 300 may utilize some of the conductive portions of the housing 310 as satellite antennas, without installing a satellite antenna having a certain volume within a relatively narrow space of the electronic device 300 or including a satellite antenna exposed to the outside. Thus, the electronic device 300 can provide an antenna having better directivity while saving its inner space.

Referring to FIG. 4, the first conductive portion 411 and the second conductive portion 412 may have different lengths. In the second state of communicating with a legacy network, the first conductive portion 411 may have a length adapted to transmit the second signal in the first frequency band to the second external electronic device, and the second conductive portion 412 may have a length adapted to transmit the third signal in the second frequency band to the third external electronic device.

According to yet another embodiment, in the first state of communicating with a satellite, the first conductive portion 411 and the second conductive portion 412 may transmit the first signal transmitted from the first wireless communication circuit 441. In the first state, the amounts of energy respectively radiated from the first conductive portion 411 and the second conductive portion 412 with different lengths may be different from each other. When the amounts of energy radiated from each the first conductive portion 411 and the second conductive portion 412 are different from each other, the amount of increase in directivity may be reduced.

Referring to FIG. 5, in the first state, in order to increase the directivity, the lengths of the first conductive portion 411 and the second conductive portion 412 may be formed to be the same as each other. When the first conductive portion 411 and the second conductive portion 412 have the same length, the amounts of energy radiated from the first conductive portion 411 and the second conductive portion 412 may be substantially the same. When the amounts of energy radiated from the respective conductive portions are the same, the directivity of the electromagnetic waves radiated from the first conductive portion 411 and the second conductive portion 412 may be increased as the constructive interference of the electromagnetic waves increases.

According to the above-described embodiment, the electronic device 300 includes the switches 511, 512, and 513, and thus, the conductive portions 411 and 412 may be used as an antenna for communicating with a legacy network. In the first state that the communication with the legacy network is disabled while the communication with a satellite is enabled, the conductive portions 411 and 412 may be used as a satellite antenna.

Figure 6:
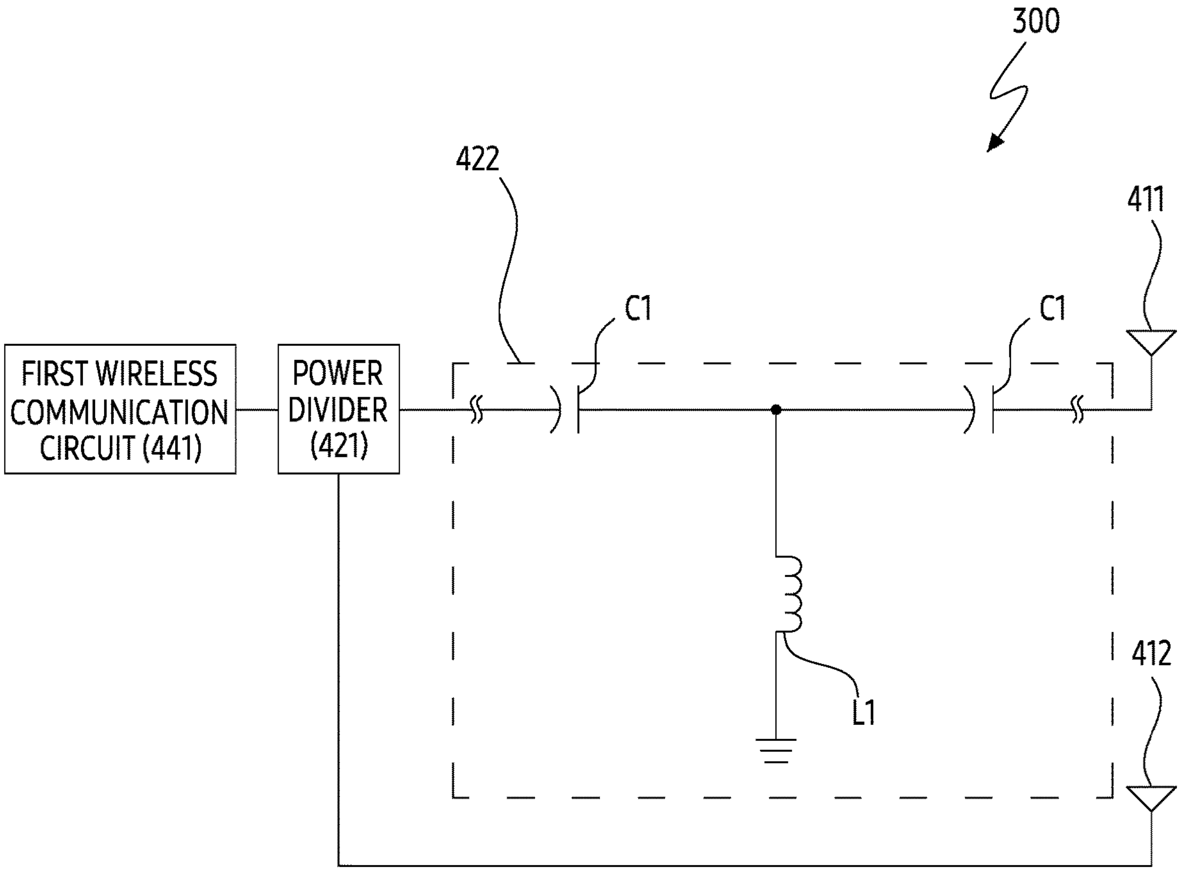
FIG. 6 is a circuit diagram of a power divider and a phase transition device according to an embodiment of the disclosure.

FIG. 6 is a circuit diagram of a power divider and a phase transition device according to an embodiment of the disclosure.

Referring to FIG. 6, the electronic device 300 may include a first conductive portion 411, a second conductive portion 412, a first wireless communication circuit 441, a power divider 421, and a phase shifter 422.

According to an embodiment, the first wireless communication circuit 441 may be electrically connected to the first conductive portion 411 and the second conductive portion 412. The first wireless communication circuit 441 may transmit a second signal having a second phase to the first conductive portion 411 as a second power. While transmitting the second power to the first conductive portion 411, the first wireless communication circuit 441 may transmit the third signal having a first phase to the second conductive portion 412 as a third power. According to one embodiment, the second signal may be radiated from the first conductive portion 411. The second signal may have a second power and a second phase for beamforming according to the first and second signals. The third signal may be radiated from the second conductive portion 412. The third signal may have a third power and a first phase.

According to an embodiment, the power transmitted from the first wireless communication circuit 441 may be distributed to the first conductive portion 411 and the second conductive portion 412 through the power divider 421. For example, the first signal transmitted from the first wireless communication circuit 441 is distributed to the first conductive portion 411 and the second conductive portion 412 through the power divider 421. The phase shifter 422 may be disposed between the first conductive portion 411 and the power divider 421. The phase shifter 422 may change the phase of the first signal transmitted with the second power. The first phase of the second signal transmitted to the first conductive portion 411 through the phase shifter 422 may be different from the second phase of the third signal transmitted to the second conductive portion 412.

According to yet another embodiment, the phase shifter 422 may include a plurality of passive elements. For example, the phase shifter 422 includes capacitors C1 and an inductor L1. The capacitors C1 may be disposed between the power divider 421 and the first conductive portion 411. The inductor L1 may be included in an electrical path grounded from a node between the capacitors C1. The phase shifter containing the capacitors C1 and the inductor L1 may change the phase of the first signal by adjusting the values of the capacitors C1 and the inductor L1.

The table 1 below shows, based on the values of capacitance of the capacitors C1 and inductance of the inductor L1, the insertion loss of the first signal transmitted to the first conductive portion 411 through the phase shifter 422, the insertion loss of the first signal transmitted to the second conductive portion 412 through the phase shifter 422, and the phase difference between the first signal transmitted to the first conductive portion 411 and the second signal transmitted to the second conductive portion 412.

TABLE 1

| C1[pF] | L1[nH] | Insertion Loss of First Conductive Portion [dB] | Insertion Loss of Second Conductive Portion [dB] | Phase Difference |
|---|---|---|---|---|
| 100 | 100 | −3.1 | −3.1 | 2.5 |
| 33 | 33 | −3.1 | −3.1 | 8 |
| 18 | 18 | −3.1 | −3.1 | 14 |
| 8.2 | 8.2 | −3.2 | −3.1 | 31 |
| 3.3 | 6.8 | −3.1 | −3.1 | 56 |
| 2.7 | 4.7 | −3.1 | −3.1 | 76 |
| 1.8 | 4.7 | −3.1 | −3.1 | 98 |
| 1.5 | 4.7 | −3.2 | −3.2 | 111 |
| 1.2 | 4.7 | −3.4 | −3.3 | 132 |

Referring to Table 1, when the capacitance of the capacitors C1 and the inductance of the inductor L1 are adjusted, the phase may be adjusted accordingly. When the phase difference increases, the signal loss may increase accordingly.

According to yet another embodiment, the phase shifter 422 may include the capacitors C1 having capacitance and the inductor L1 having inductance which are determined based on the phase difference causing the constructive interference.

According to the above-described embodiment, the phase shifter 422 may have the phase difference capable of increasing the directivity of the first signal radiated through the first conductive portion 411 and the second conductive portion 412. The electronic device 300 may increase the directivity by changing the phase of the signal transmitted to a conductive portion of one of the first conductive portion 411 and the second conductive portion 412 disposed adjacent to each other. The electronic device 300 including the phase shifter 422 may include an antenna capable of supporting a satellite communication.

Figure 7:
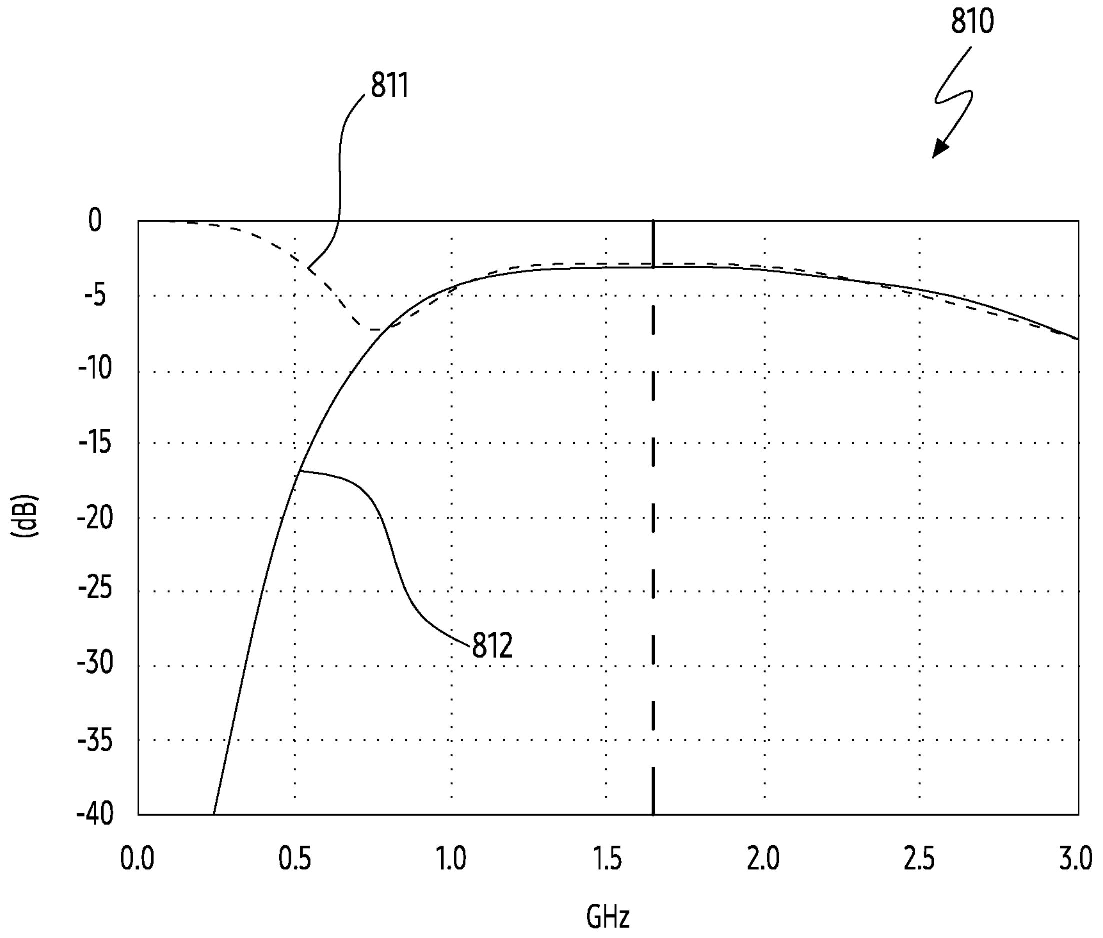
FIG. 7 shows a magnitude of signals distributed to a first conductive portion and a second conductive portion, according to an embodiment of the disclosure.

FIG. 7 shows the magnitude of signals distributed to a first conductive portion and a second conductive portion, according to an embodiment of the disclosure.

Figure 8:
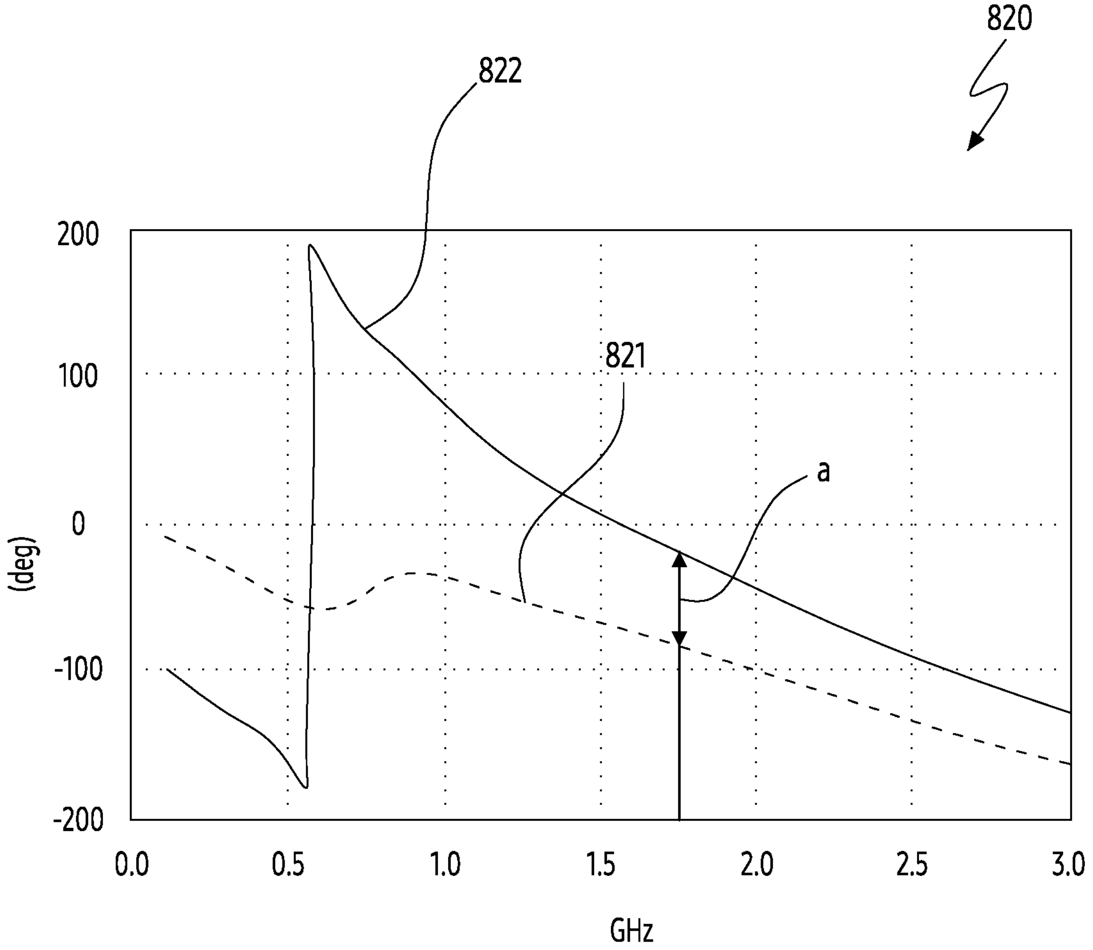
FIG. 8 shows phases of signals distributed to a first conductive portion and a second conductive portion, according to an embodiment of the disclosure.

FIG. 8 shows the phase of signals distributed to a first conductive portion and a second conductive portion, according to an embodiment of the disclosure.

Referring to FIG. 7, the graph 810 shows the signal loss of a signal transmitted to the first conductive portion 411 and the signal loss of a signal transmitted to the second conductive portion 412, according to a frequency in use. The first graph 811 represents the signal loss of the signal transmitted to the first conductive portion 411 through the power distribution circuit 420. The second graph 812 represents the loss of the signal transmitted to the second conductive portion 412 through the power distribution circuit 420.

The graphs show the signal loss and the phase difference of the first signal passing through the power distribution circuit 420. At about 1.6 GHz, which is the frequency at which resonance occurs, it may be seen that the signal loss in both the first graph 811 and the second graph 812 is relatively small.

Referring to FIG. 8, in graph 820, at a resonance frequency of about 1.6 GHz, a difference may occur between a phase of a signal transmitted to the first conductive portion 411 and a phase of a signal transmitted to the second conductive portion 412. The third graph 821 represents the phase of the signal transmitted to the first conductive portion 411 through the power distribution circuit 420. The graph 822 represents the phase of the signal transmitted to the second conductive portion 412 through the power distribution circuit 420. At about 1.6 GHz, the difference (a) between the phase of the signal transmitted to the first conductive portion 411 and the phase of the signal transmitted to the second conductive portion 412 may be approximately 60 degrees. The signal transmitted to the first conductive portion 411 may be delayed from the phase of the signal transmitted to the second conductive portion 412, by the phase shifter (e.g., the phase shifter 422 of FIG. 3).

According to an embodiment, the power distribution circuit 420 including the phase shifter 422 and the power divider 421 may transmit a signal with a converted phase through the phase shifter 422 to the first conductive portion 411 and transmit a signal without passing through the phase shifter 422 to the second conductive portion 412, thereby transmitting a signal with increased directivity in a desired frequency band to the outside of the electronic device 101. The phase difference of the signals transmitted to the first conductive portion 411 and the second conductive portion 412 may be determined based on a separation distance between the first conductive portion 411 and the second conductive portion 412, a position of the feeding point, a distance from the ground portion, or other parameters. The phase shifter 422 and the power divider 421 may determine values of the passive elements based on the phase difference. According to another embodiment, the passive element of the phase shifter 422 may include a variable component. When it is required a change in the frequency of the signal transmitted to an external electronic device (e.g., a satellite) through the first conductive portion 411 and the second conductive portion 412, the values of the passive elements in the phase shifter 422 may vary.

The electronic device 300 according to the above-described embodiment can increase the directivity of the signal transmitted to an external electronic device such as a satellite. The electronic device 300 may perform satellite communication by tuning the passive elements in the phase shifter 422 to have a phase difference with higher directivity. For example, the electronic device 300 transmits the first signal having the first phase to the first conductive portion 411 and transmit the first signal having the second phase to the second conductive portion 412, with the phase difference causing the constructive interference. The first signals may cause the constructive interference with each other, thereby enabling to have the high directivity in a direction perpendicular to the first side surface 401 of the electronic device 300.

Figure 9:
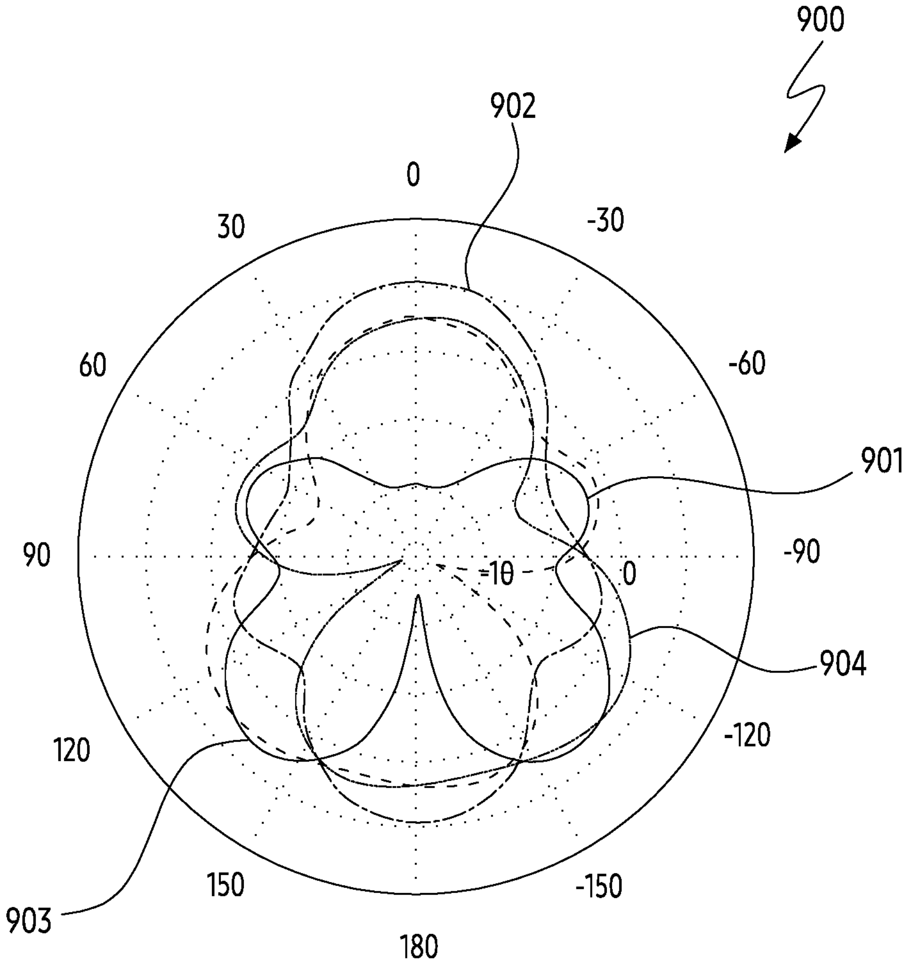
FIG. 9 shows a directivity of a signal according to a phase difference between a signal transmitted to a first conductive portion and a signal transmitted to a second conductive portion, according to an embodiment of the disclosure.

FIG. 9 exhibits the directivity of a signal according to a phase difference between a signal transmitted to a first conductive portion and a signal transmitted to a second conductive portion, according to an embodiment of the disclosure.

Referring to FIG. 9, the graph 900 exhibits the direction and size of the signal transmitted to the outside through the first conductive portion 411 and the second conductive portion 412, based on the phase difference between the first conductive portion 411 and the second conductive portion 412 that are formed symmetrical to each other.

The graph 901 shows the direction and size of the signal transmitted to the outside when the signals transmitted to the first conductive portion 411 and the second conductive portion 412 are the same signal with the same phase. The graph 902, the graph 903, and the graph 904 indicate the direction and size of the signal transmitted to the outside, in case where the signals transmitted to the first conductive portion 411 and the second conductive portion 412 are the same signals with different phases. For example, through the power distribution circuit 420, the first signal having a first phase is transmitted to the first conductive portion 411 and the first signal having a second phase may be transmitted to the second conductive portion 412. In the graph 902, the difference in between the first phase of the first signal transferred to the first conductive portion 411 and the second phase of the first signal transferred to the second conductive portion 412 may be substantially 180 degrees. In the graph 903, the difference in between the first phase of the first signal transmitted to the first conductive portion 411 and the second phase of the first signal transmitted to the second conductive portion 412 may be substantially 90 degrees. In the graph 904, the difference in between the first phase of the first signal transmitted to the first conductive portion 411 and the second phase of the first signal transmitted to the second conductive portion 412 may be substantially −90 degrees.

Looking further at the graphs 901 and 902, it is seen that there is a difference of about 15 dB or so, when comparing the phases in the direction (0 degrees) toward the first side surface of the electronic device 300. In the graph 902, it is seen that the electronic device 300 may have more increased a gain in the case having such a phase difference between signals transmitted to the first conductive portion 411 and the second conductive portion 412 than the case having an equal phase of the signals or a less phase difference of the signals.

According to the above-described embodiment, when adjusting the phase difference between the signal transmitted to the first conductive portion 411 and the signal transmitted to the second conductive portion 412, a radiation pattern of the signal transmitted from the first conductive portion 411 and the second conductive portion 412 to the outside can be adjusted. The phase difference between the signal transmitted to the first conductive portion 411 and the signal transmitted to the second conductive portion 412 for increasing the directivity may be changed depending on the shape of the first conductive portion 411 and the second conductive portion 412, the arrangement of the first conductive portion 411 and the second conductive portion 412, the power feeding of the first conductive portion 411 and the second conductive portion 412, or other parameters. The phase difference may be changed based on the value of passive elements in the phase shifter 422 included in the power distribution circuit 420. With such a proper phase adjustment by means of the phase shifter 422, the electronic device 300 can increase the directivity of the signal according to the synthesis of the signals transmitted to the first conductive portion 411 and the signal transmitted to the second conductive portion 412, thereby enabling communicating with a very remote external electronic device.

Figure 10:
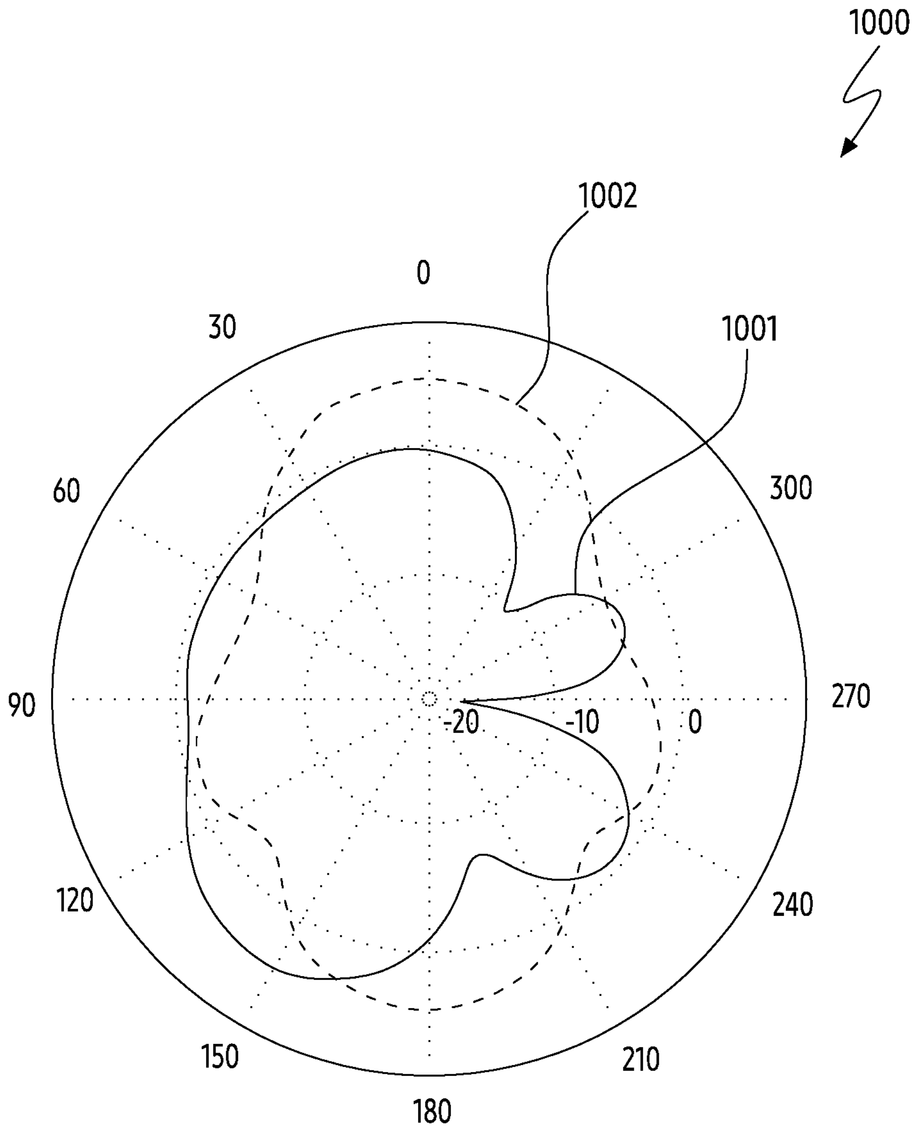
FIG. 10 shows a directivity of an electronic device including a symmetrical type of first conductive portion and second conductive portion, according to an embodiment of the disclosure.

FIG. 10 exhibits the directivity of an electronic device including a symmetrical type of a symmetrical first conductive portion and a second conductive portion, according to an embodiment of the disclosure.

Figure 11:
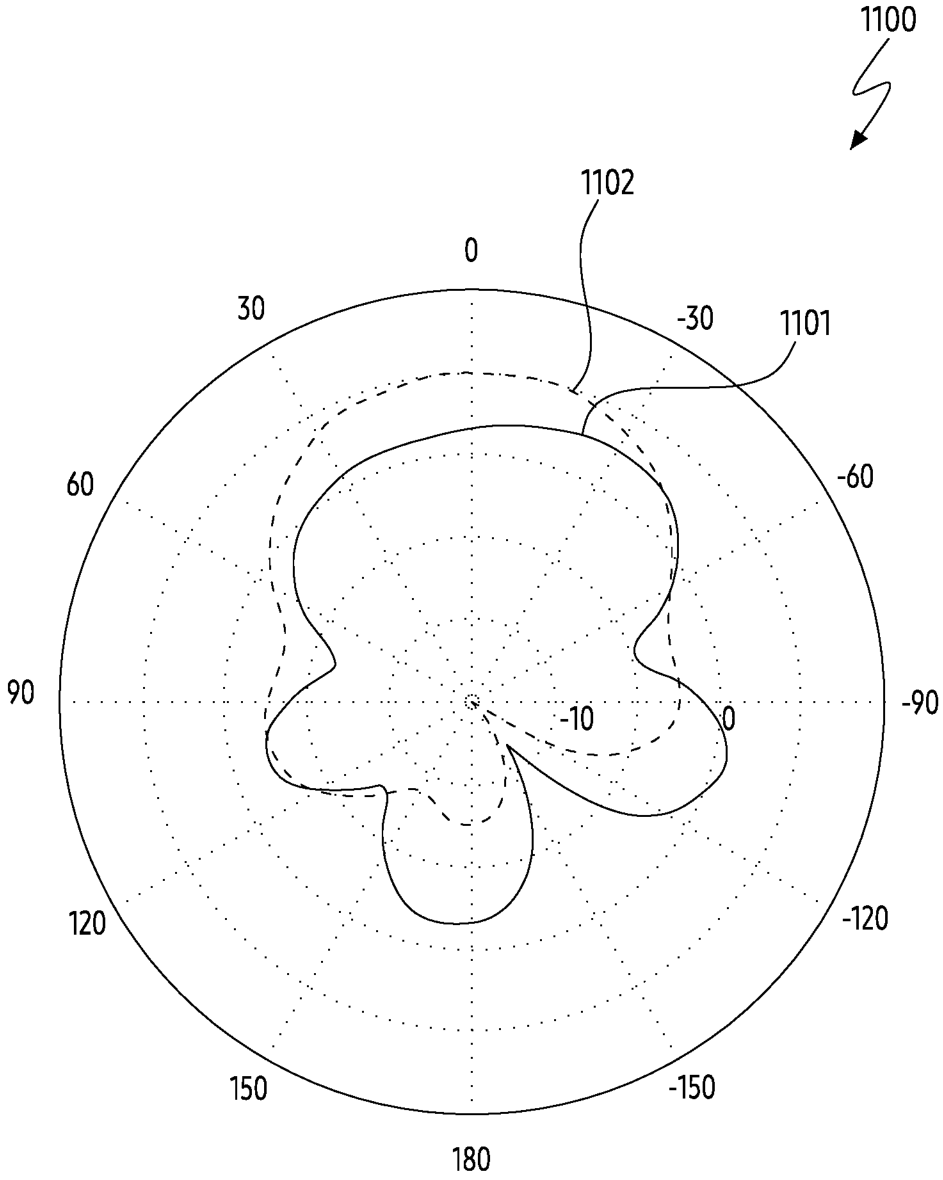
FIG. 11 shows a directivity of an electronic device including an asymmetrical type of first conductive portion and second conductive portion, according to an embodiment of the disclosure.

FIG. 11 exhibits the directivity of an electronic device including an asymmetrical type of a first conductive portion and a second conductive portion, according to an embodiment of the disclosure.

According to an embodiment, a degree of improvement in directivity may vary depending on the shape of the first conductive portion 411 and the second conductive portion 412 (e.g., the position of the first non-conductive portion 413 or the lengths of the first conductive portion 411 and the second conductive portion 412).

Referring to FIG. 10, the graph 1000 exhibits a radiation pattern when the first conductive portion 411 and the second conductive portion 412 are symmetrical to each other.

The first conductive portion 411 and the second conductive portion 412 being symmetrical to each other may mean that the lengths of the first conductive portion 411 and the second conductive portion 412 are the same as each other and the first conductive portion 411 and the second conductive portion 412 are symmetrical with respect to the first non-conductive portion 413.

The radius component in the graph 1000 has a unit of dB and may be a magnitude of a combined signal of the signals transmitted from the first conductive portion 411 and the second conductive portion 412. The angular component of graph 1000 has a unit of deg and may indicate a direction of the combined signal. The graph 1000 indicates a radiation pattern of the combined signal transmitted from the first conductive portion 411 and the second conductive portion 412.

The graph 1001 indicates the radiation pattern of the first conductive portion 411 and the second conductive portion 412, when the same signals without phase difference are transmitted through the first conductive portion 411 and the second conductive portion 412 that are symmetrical to each other. The graph 1002 indicates the radiation pattern of the first conductive portion 411 and the second conductive portion 412, when the same signals with phase difference are transmitted through the first conductive portion 411 and the second conductive portion 412 which are symmetrical to each other. The phase difference may be a phase difference capable of causing a constructive interference of the signal radiated from the first conductive portion 411 and the second conductive portion 412.

According to another embodiment, the electronic device having the first conductive portion 411 and the second conductive portion 412 that are symmetrical to each other can improve the directivity of the signal transmitted through the first conductive portion 411 and the second conductive portion 412 for each of the signals with the phase difference causing the constructive interference. For example, the magnitude of the signal synthesized and transmitted through the first conductive portion 411 and the second conductive portion 412 for each of the signals with the phase difference causing the constructive interference is about 5 dB larger than that of the signal synthesized and transmitted through the first conductive portion 411 and the second conductive portion 412 for each of the same signals, in a direction (zero degree) toward the first side surface.

Referring to FIG. 11, the graph 1100 shows the radiation pattern when the first conductive portion 411 and the second conductive portion 412 are asymmetrical.

The first conductive portion 411 and the second conductive portion 412 being asymmetrical to each other may mean that the lengths of the first conductive portion 411 and the second conductive portion 412 are different from each other, or the first conductive portion 411 and the second conductive portion 412 are asymmetrical with respect to the first non-conductive portion 413.

The radius component in the graph 1100 has a unit of dB, and may be a magnitude of the combined signal of the signals transmitted from the first conductive portion 411 and the second conductive portion 412. The angular component in the graph 1100 has a unit of deg and may represent the direction of the combined signal. The graph 1100 may indicate the radiation pattern of the combined signal transmitted from the first conductive portion 411 and the second conductive portion 412.

The graph 1101 exhibits the radiation pattern of the first conductive portion 411 and the second conductive portion 412, when the same signals with no phase difference are transmitted through the first conductive portion 411 and the second conductive portion 412 that are asymmetric to each other. The graph 1101 exhibits the radiation pattern of the first conductive portion 411 and the second conductive portion 412, when the same signals with a phase difference are transmitted through the first conductive portion 411 and the second conductive portion 412 which are asymmetric to each other. The phase difference may be a phase difference capable of causing the constructive interference of the signals radiated from the first conductive portion 411 and the second conductive portion 412 that are asymmetrical to each other.

According to an embodiment, the electronic device with the first conductive portion 411 and the second conductive portion 412 that are asymmetric to each other can improve the directivity of the signals transmitted through the first conductive portion 411 and the second conductive portion 412, for each of the signals with the phase difference causing the constructive interference. For example, the magnitude of the signal synthesized and transmitted through the first conductive portion 411 and the second conductive portion 412 for each of the signals with the phase difference causing the constructive interference is about 3 dB larger than that of the signal synthesized and transmitted through the first conductive portion 411 and the second conductive portion 412 for each of the same signals, in the direction (zero degree) toward the first side surface.

Referring to FIGS. 10 and 11, in the electronic device (e.g., the electronic device exhibiting the graph of FIG. 10) with the first conductive portion 411 and the second conductive portion 412, being symmetrical to each other, the magnitude of the electromagnetic wave transmitted through the first conductive portion 411 and the second conductive portion 412 in the direction of the first side surface (e.g., the upper end of the electronic device) may be about 5.1 dB. Further, in the electronic device (e.g., the electronic device exhibiting the graph of FIG. 11) with the first conductive portion 411 and the second conductive portion 412, being asymmetrical to each other, the magnitude of the electromagnetic wave transmitted through the first conductive portion 411 and the second conductive portion 412 in the direction of the first side surface (e.g., the upper end of the electronic device) may be about 4.9 dB.

When the first conductive portion 411 and the second conductive portion 412 are formed symmetrically, the radiation pattern may be ideally formed. For example, the radiation pattern is formed in symmetry, it leads to a relatively large increased directivity. When the first conductive portion 411 and the second conductive portion 412 are formed asymmetrically, the radiation pattern may be asymmetric. Since the radiation energy transferred to the first conductive portion 411 and the radiation energy transferred to the second conductive portion 412 are different from each other, the amount of increase in directivity may be relatively reduced.

Comparing the graph 1000 and the graph 1100, the magnitude of electromagnetic waves directed in the first side surface direction (e.g., zero degree direction) may be substantially similar to each other. Therefore, even in case where the first conductive portion 411 and the second conductive portion 412 are asymmetric, the directivity can be increased by means of the phase adjustment.

Figure 12:
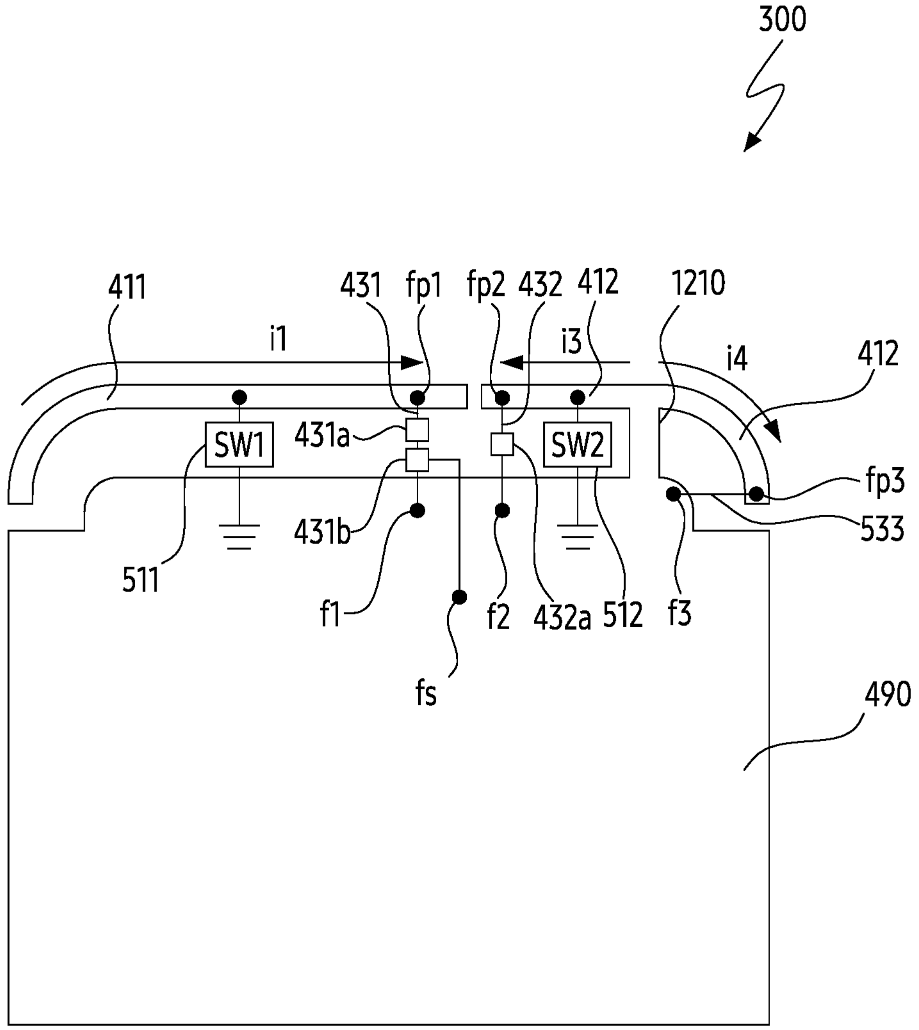
FIG. 12 is a schematic diagram of an electronic device including a second conductive portion connected to a ground portion, according to an embodiment of the disclosure.

FIG. 12 is a schematic diagram of an electronic device including a second conductive portion connected to a ground portion, according to an embodiment of the disclosure.

Referring to FIG. 12, an electronic device 300 may include a first conductive portion 411 and a second conductive portion 412. The electronic device 300 may include a non-conductive portion (e.g., the first non-conductive portion 413 in FIG. 3) configured to separate the first conductive portion 411 and the second conductive portion 412. A housing (e.g., the housing 310 of FIG. 3) may include the first conductive portion 411, the second conductive portion 412, and the non-conductive portion. The electronic device 300 may simultaneously use the first conductive portion 411 and the second conductive portion 412 as an antenna radiator to communicate with an external electronic device such as a satellite. The first conductive portion 411 may transmit and/or receive a signal for legacy communication through a first feeding point fp1 in order to support the legacy communication (e.g., Wi-Fi, LTE, or GPS). The first conductive portion 411 may transmit and/or receive the signal for satellite communication.

According to an embodiment, the electronic device 300 may further include a first matching circuit 431*a* disposed on the first line 431, and a first line selection circuit 431*b* disposed between a connecting point f1 connected to a second wireless communication circuit 442 (e.g., the second wireless communication circuit 442) connected to the first line 431 and a connecting point fs connected to a first wireless communication circuit 441 (e.g., the first wireless communication circuit 441 of FIG. 3). For example, the first wireless communication circuit 441 may be electrically connected to the first line 431 through the point fs. The first wireless communication circuit 441 may be fed to a first feeding point fp1 of the first conductive portion 411 via the first line 431. The second wireless communication circuit 442 may be electrically connected to the first line 431 through the connecting point f1. The second wireless communication circuit 442 may be fed to the first feeding point fp1 of the first conductive portion 411 via the first line 431. The first line selection circuit 431*b* may transmit one of a first signal transmitted from the first wireless communication circuit 441 and a second signal transmitted from the second wireless communication circuit 442, to the first conductive portion 411. The first matching circuit 431*a* may be disposed between the first feeding point fp1 and the first line selection circuit 431*b*. The first conductive portion 411 connected to the first line 431 may be matched through the first matching circuit 431*a*.

According to another embodiment, the electronic device 300 may further include a second matching circuit 432*a* disposed on a second line 432. For example, a third wireless communication circuit 443 is electrically connected to the second line 432 through a connecting point f2. The third wireless communication circuit 443 may be fed to a second feeding point fp2 of the second conductive portion 412 via the second line 432. The second conductive portion 412 connected to the second line 432 may be matched through the second matching circuit 432*a*.

According to yet another embodiment, the electronic device 300 may include a ground portion 490. The ground portion 490 may be disposed in the housing 310 (e.g., the housing 310 of FIG. 2). The ground portion 490 may be spaced apart from the first conductive portion 411 and may be connected to the second conductive portion 412. For example, the ground portion 490 is spaced apart from the first conductive portion 411 into the electronic device 300. The ground portion 490 may be electrically connected to the second conductive portion 412 via a conductive flange 1210. For example, the conductive flange 1210 is disposed between the second conductive portion 412 and the ground portion 490.

According to yet another embodiment, the first conductive portion 411 and the second conductive portion 412 may be selectively connected to the ground portion 490 by a plurality of switches 511 and 512. For example, the electronic device 300 includes a first switch 511 and a second switch 512. The first switch 511 may be disposed between the first conductive portion 411 and the ground portion 490. In the first state of communicating with a first external electronic device (e.g., a satellite), the first switch 511 may electrically disconnect the first conductive portion 411 and the ground portion 490. In the second state of communicating with a second external electronic device or a third external electronic device, the first switch 511 may electrically connect the first conductive portion 411 and the ground portion 490.

According to yet another embodiment, the second switch 512 may be disposed between the second conductive portion 412 and the ground portion 490. In the first state of communication, the second switch 512 may electrically disconnect the second conductive portion 412 and the ground portion 490. In the second state, the second switch 512 may electrically connect the second conductive portion 412 and the ground portion 490.

According to an embodiment, in the first state, the first switch 511 and the second switch 512 may be opened. With such an opening of the first switch 511 and the second switch 512, the first conductive portion 411 may be electrically disconnected from the ground portion 490 and the second conductive portion 412 may be electrically connected to the ground portion 490 via the conductive flange 1210. The first conductive portion 411 and the second conductive portion 412 may operate similarly to a radiator of a dipole antenna. The first signal from the first wireless communication circuit (e.g., the first wireless communication circuit 441 of FIG. 3) may be fed to the first conductive portion 411 through the first feeding point fp1. The third signal from the third wireless communication circuit (e.g., the third wireless communication circuit 443 of FIG. 3) may be fed to the second conductive portion 412 through the second feeding point fp2. The first signal may be substantially the same signal as the third signal. While power is supplied through the first feed point fp1, the first conductive portion 411 and the second conductive portion 412 may be coupled.

For example, the first conductive portion 411 and the second conductive portion 412 may operate as an antenna radiator by currents (i1, i4) flowing in the same direction. The second conductive portion 412 electrically connected to the ground portion 490 via the conductive flange 1210 may operate as an antenna radiator by currents (i3, i4) flowing in different directions with respect to the ground portion 490. The current i4 flowing through the second conductive portion 412 may flow in the same direction as the current it flowing through the first conductive portion 411. The electronic device 300 may transmit the first signal to the external electronic device by means of the currents (i1, i4) flowing through the surface of the conductive portions in the same direction.

According to an embodiment, in the second state, the first switch 511 and the second switch 512 may be closed. With such closing of the first switch 511 and the second switch 512, the first conductive portion 411 may be electrically connected to the ground portion 490, and the second conductive portion 412 may be electrically connected to the ground portion 490. The first conductive portion 411 and the second conductive portion 412 may respectively operate as an antenna radiator transmitting signals of different frequencies to an external electronic device. The second signal transferred from the second wireless communication circuit (e.g., the second wireless communication circuit 442 of FIG. 3) may be fed to the first conductive portion 411, through the first feeding point fp1. A fourth signal transmitted from the third wireless communication circuit (e.g., the third wireless communication circuit 443 of FIG. 3) may be fed to the second conductive portion 412, through the second feeding point fp2. A fifth signal transmitted from the third wireless communication circuit 443 or another wireless communication circuit through the third line 533 may be fed to the second conductive portion 412, through a third feeding point fp3. The first switch 511, the second switch 512, and the conductive flange 1210 may short-circuit between the first conductive portion 411 and the ground portion 490, and may short-circuit between the second conductive portion 412 and the ground portion 490. Although the second conductive portion 412 and the ground portion 490 are illustrated to be connected through the conductive flange 1210, the disclosure is not limited thereto. For example, the second conductive portion 412 and the ground portion 490 are selectively connected through a switch (e.g., the third switch 513 of FIG. 4).

According to an embodiment, the first conductive portion 411 or the second conductive portion 412 short-circuited with the ground portion 490 may be an antenna supporting a legacy communication network (e.g., the first cellular network 292 in FIG. 2). The first switch 511, the second switch 512, and the conductive flange 1210 may be configured to isolate antenna radiators (e.g., the first conductive portion 411 and the second conductive portion 412). For example, the second switch 512 connected to the ground portion 490 and the third conductive flange 1210 function to isolate signals supplied to the second feeding point fp2 connected to the second line 432 and the third feeding point fp3 connected to the third line 533.

According to an embodiment, the processor 120 (e.g., the processor 120 of FIG. 2) may be configured to electrically disconnect the first conductive portion 411 and the ground portion 490, through the first switch 511, while the first signal with the first phase is transmitted. According to an embodiment, the processor 120 may be configured to electrically disconnect the second switch 512 from the second conductive portion 412 and the ground portion 490, while the first signal with the second phase is transmitted.

According to an embodiment, the processor 120 may be configured to open/close the switches 511 and 512 according to a communication state (e.g., a first state or a second state) with an external electronic device. In the first state, by opening the first switch 511 and the second switch 512, the processor 120 may control the first conductive portion 411 and the second conductive portion 412 to operate substantially as dipole antennas. In the second state, the processor 120 may control each of the first conductive portion 411 and the second conductive portion 412 to operate as an antenna radiator by short-circuiting the first switch 511 and the second switch 512.

According to the above-described embodiment, the electronic device 300 can utilize some of the conductive portions of the housing 310 as a satellite antenna, without installing a satellite antenna having a certain volume within a relatively narrow space of the electronic device 300 or including a satellite antenna exposed to the outside. The electronic device 300 can provide an antenna having improved directivity while saving space. Further, the electronic device 300 can utilize an existing legacy antenna, with inclusion of the conductive flange 1210.

According to the above-described embodiment, an electronic device (e.g., an electronic device 400 of FIG. 3) may include a housing (e.g., a housing 310 of FIG. 3). The housing may include a first conductive portion (e.g., a first conductive portion 411 of FIG. 3) disposed along an edge of the housing, a second conductive portion (e.g., a second conductive portion 412 of FIG. 3) disposed along the edge, and a non-conductive portion (e.g., a first non-conductive portion 413 of FIG. 3) between the first conductive portion and the second conductive portion. According to an embodiment, the electronic device may include a power divider (e.g., a power divider 421 of FIG. 3). The power divider may be electrically connected to a first portion close to the non-conductive portion, amongst the first portion (e.g., a first portion P1 of FIG. 3) including a first end (e.g., a first end 411*a* of FIG. 3) and a second portion (e.g., a second portion P2 of FIG. 3) including a second end (e.g., a second end 411*b* of FIG. 3) of the first conductive portion, and may be electrically connected to a third portion close to the non-conductive portion, amongst the third portion (e.g., a third portion P3 of FIG. 3) including a third end (e.g., a third end cl of FIG. 3) and a fourth portion (e.g., a fourth portion P4 of FIG. 3) including a fourth end (e.g., a fourth end 412*b* of FIG. 3) of the second conductive portion. The electronic device may include a first wireless communication circuit (e.g., a first wireless communication circuit 441 of FIG. 3). The first wireless communication circuit may be connected to the power divider. According to yet another embodiment, the electronic device may include a processor (e.g., a processor 120 of FIG. 3). The processor may be configured to transmit a first signal having a first phase, with a second power distributed from the power provided to the power divider from the first wireless communication circuit, to a first external electronic device via the first conductive portion. According to yet another embodiment, the electronic device may be configured to transmit the first signal having a second phase distinct from the first phase, with a third power distributed from the power, to the first external electronic device via the second conductive portion, while the first signal of the first phase is transmitted.

According to the above-described embodiment, the electronic device can increase the directivity of a signal transmitted from an antenna radiator in order to communicate with an external electronic device located at a long distance, such as a satellite, etc. According to yet another embodiment, the electronic device can transmit the signals having different phases to the first conductive portion and the second conductive portion, so as to overcome spatial limitation in the first conductive portion and the second conductive portion forming a housing of the electronic device, which require a half-wavelength separation distance of the signal. The signals with different phases can generate a constructive interference with each other. These signals can cause the constructive interference with each other, thereby obtaining the directivity in a direction perpendicular to the edges formed by the first conductive portion and the second conductive portion of the electronic device.

According to yet another embodiment, the electronic device may further include a phase shifter. According to yet another embodiment, the power divider may be fed to the first conductive portion through the first portion, via the phase shifter. According to an embodiment, the processor may be configured to transmit the first signal of the first phase converted from the second phase through the phase shifter to the first external electronic device with the second power.

According to the above-described embodiment, the electronic device can make a first phase of a first signal transmitted to a first conductive portion and a second phase of the first signal transmitted to a second conductive portion to be different from each other, by means of the phase transducer. The first conductive portion and the second conductive portion can be provided with signals having different phases, thereby improving the directivity of the signals transmitted to an external electronic device.

According to yet another embodiment, the electronic device may include a ground portion (e.g., a ground portion 490 of FIG. 4), a first switch (e.g., a first switch 511 of FIG. 4), and a second switch (e.g., a first switch 511 of FIG. 4). The ground portion may be space apart from the first conductive portion and the second conductive portion, and may be disposed in the housing. The first switch may be disposed between the first conductive portion and the ground portion. The second switch may be disposed between the second conductive portion and the ground portion 490.

According to yet another embodiment, the processor may be configured to electrically disconnect the first conductive portion and the ground portion via the first switch, while the first signal having the first phase is transmitted.

According to yet another embodiment, the processor may be configured to electrically disconnect the second conductive portion and the ground portion via the second switch, while the first signal of the second phase is transmitted.

According to the above-described embodiment, the electronic device may electrically disconnect the first conductive portion and the second conductive portion from the feeding point (e.g., the first feeding point (fp1) or the second feeding point (fp2)), while performing wireless communication with an external electronic device such as a satellite, using the first conductive portion and the second conductive portion. The first conductive portion and the second conductive portion electrically disconnected from the ground portion may operate similarly to a dipole antenna.

According to yet another embodiment, the electronic device may include a second wireless communication circuit (442) and a third wireless communication circuit (443). According to yet another embodiment, the second wireless communication circuit may be configured to feed power to the first conductive portion through the first portion.

According to yet another embodiment, the third wireless communication circuit may be configured to feed power to the second conductive portion through the third portion.

According to yet another embodiment, the processor may be configured to communicate with a second external electronic device distinguished from the first external electronic device, via the first conductive portion, with a third transmission power obtained from the second wireless communication circuit, using a second signal different from the first signal.

According to yet another embodiment, the processor may be configured to communicate with a third external electronic device distinguished from the first external electronic device through the second conductive portion, with a fourth transmission power obtained from the third wireless communication circuit, using a third signal different from the first signal and the second signal.

The electronic device according to the above-described embodiment may be configured such that a signal transmitted to the first conductive portion is different from a signal transmitted to the second conductive portion, while using the legacy network. The electronic device may use the first conductive portion and the second conductive portion as separate antenna radiators.

According to yet another embodiment, the processor may be configured to deactivate the second wireless communication circuit and the third wireless communication circuit, based on activation of the first wireless communication circuit.

According to yet another embodiment, the processor may be configured to deactivate the first wireless communication circuit, based on activation of the second wireless communication circuit or the third wireless communication circuit.

According to the above-described embodiment, the electronic device may deactivate the first wireless communication circuit, while the first conductive portion or the second conductive portion is used as an antenna radiator for a legacy network. The electronic device may deactivate the second wireless communication circuit and the third wireless communication circuit, while the first conductive portion and the second conductive portion are used as antenna radiators for a satellite communication network. The electronic device may convert the first conductive portion and the second conductive portion into a radiator for communicating with a satellite and a radiator for communicating with a legacy network. The electronic device can increase the space efficiency within the electronic device, by enabling the first conductive portion and the second conductive portion to operate as a plurality of antennas.

According to yet another embodiment, the electronic device may include a first filter and a second filter. The first filter may connect the second wireless communication circuit and the first portion, and the second filter may connect the third wireless communication circuit and the third portion.

According to yet another embodiment, the processor may be configured to block at least part of the second signal transmitted to the first conductive portion through the first filter, while transmitting the first signal to the first external electronic device.

According to yet another embodiment, the processor may be configured to block at least part of the third signal transmitted to the second conductive portion through the second filter.

According to the embodiment, the electronic device can prevent other signals distinguished from the signals supporting a satellite from being transmitted to the first and second conductive portions, while transmitting the signal supporting a satellite through the first conductive portion and the second conductive portion.

According to yet another embodiment, a distance between the first conductive portion and the second conductive portion may be shorter than a half-wavelength of the first signal.

According to the above-described embodiment, the electronic device can improve the directivity, notwithstanding the first conductive portion and the second conductive portion spaced apart from each other at a shorter interval than a half-wavelength of the first signal emitted to the outside. The electronic device may generate constructive interference of signals, by converting phases of a signal transmitted to the first conductive portion and a signal transmitted to the second conductive portion. Based on the constructive interference, the electronic device can improve the directivity of the signal transmitted to the external electronic device. According to the above-described embodiment, the electronic device can enhance the spatial efficiency in arrangement of the antenna radiators, by implementing reduced distance between the first conductive portion and the second conductive portion. The electronic device can reduce the relationship between the distance between the antenna radiators and the wavelength of the signal.

According to yet another embodiment, the first conductive portion may be symmetrical to the second conductive portion with respect to the non-conductive portion.

According to the above-described embodiment, the first conductive portion and the second conductive portion, which are symmetrical to each other, can transmit the same amount of radiation energy to the outside. The electronic device can improve the directivity, while performing communication with a satellite, by transmitting the same radiation energy through each conductive member.

According to yet another embodiment, the first conductive portion may be asymmetric to the second conductive portion with respect to the non-conductive portion.

According to the above-described embodiment, the first conductive portion and the second conductive portion may be configured to transmit signals with different frequencies, respectively. The first conductive portion and the second conductive portion may operate as an antenna radiator supplying different signals, while communicating with external electronic devices other than satellites.

According to yet another embodiment, the power divider may include a plurality of passive elements.

According to the above-described embodiment, the power divider may adjust the amount of power distributed, using a plurality of passive elements.

According to yet another embodiment, a difference between the first phase and the second phase may be substantially 40 to 50 degrees.

According to the above-described embodiment, the electronic device may transmit the first signal to the external electronic device through the first conductive portion and the second conductive portion in the first phase and the second phase, respectively. The first signal having the first phase and the second phase may cause the constructive interference with each other to improve the directivity.

According to yet another embodiment, the housing may include a first side surface (e.g., a first side surface 401 of FIG. 3), a second side surface (e.g., a second side surface 402 of FIG. 3) extending from one end of the first side surface in a direction perpendicular to the first side surface, and a third side surface (e.g., a third side surface 403 of FIG. 3) extending from another end of the first side surface in a direction parallel to the second side surface.

According to yet another embodiment, the first conductive portion and the second conductive portion may be disposed along the first side surface. According to yet another embodiment, the first conductive portion may be disposed along a part of the second side surface in contact with the first side surface, and the second conductive portion may be disposed along a part of the third side surface in contact with the first side surface. According to yet another embodiment, a distance from a second end of the first conductive portion positioned at the second side surface to the first side surface may be the same as a distance from a fourth end of the second conductive portion positioned at the third side surface to the first side surface.

According to the above-described embodiment, the energy radiated through the first conductive portion and the second conductive portion may be formed to be substantially the same, by making the positions of the other ends of the first conductive portion and the second conductive portion from the first side surface substantially the same as each other.

According to yet another embodiment, each of the first conductive portion and the second conductive portion may operate as an antenna radiator.

According to yet another embodiment, while transmitting the first signal to the first external electronic device, a combined electromagnetic wave of the electromagnetic wave transmitted from the first conductive portion and the electromagnetic wave transmitted from the second conductive portion may be perpendicular to the first conductive portion and may proceed toward the outside of the housing.

According to the above-described embodiment, the electronic device can improve the directivity of the first signal, by combining the first signal radiated from the first conductive portion and the first signal radiated from the second conductive portion. For example, the electronic device causes occurrence of constructive interference of the signals, by providing different phases of the signals transmitted to the first conductive portion and the signal transmitted to the second conductive portion. The electronic devices can improve the directivity, notwithstanding the first conductive portion and the second conductive portion spaced apart at an interval shorter than a half-wavelength of the first signal radiated to the outside.

According to yet another embodiment, the frequency band of the first signal may be about 1.6 GHz to 1.7 GHz.

According to the above-described embodiment, the electronic device (e.g., an electronic device 300 of FIG. 12) may include a housing (e.g., a housing 310 of FIG. 3). The housing may include a first conductive portion (e.g., a first conductive portion 411 of FIG. 12) disposed along an edge of the housing, a second conductive portion (e.g., a second conductive portion 412 of FIG. 12) disposed along the edge, and a non-conductive portion (e.g., a first non-conductive portion 413 of FIG. 3) between the first conductive portion and the second conductive portion. The electronic device (300) may include a ground portion (e.g., a ground portion 490 of FIG. 12). The ground portion may be disposed in the housing, connected to the second conductive portion, and spaced apart from the first conductive portion. According to yet another embodiment, the electronic device may include a first wireless communication circuit (e.g., a first wireless communication circuit 441 of FIG. 3). The first wireless communication circuit may be electrically connected to a first portion close to the non-conductive portion, amongst the first portion (e.g., a first portion P1 of FIG. 3) including the first end of the first conductive portion and a second portion (e.g., a second portion P2 of FIG. 3). The electronic device may include a second wireless communication circuit (e.g., a second wireless communication circuit 442 of FIG. 3). According to yet another embodiment, the second wireless communication circuit may be electrically connected to a third portion close to the non-conductive portion, among the third portion including a third end of the second conductive portion and a fourth portion including a fourth end. The electronic device may include a processor (e.g., a processor 120 of FIG. 3). The processor may be configured to transmit a first signal having a first phase to a first external electronic device through the first conductive portion, with a second power obtained from the first wireless communication circuit. The processor may be configured to, while the first signal with the first phase is transmitted, transmit a second signal having a second phase different from the first phase, to the first external electronic device through the second conductive portion, with a third power obtained from the second wireless communication circuit.

According to the above-described embodiment, the electronic device can increase the directivity of the signals transmitted from an antenna radiator, in order to communicate with a long-distance external electronic device such as a satellite. According to yet another embodiment, the electronic device can transmit the signals with different phases to the first conductive portion and the second conductive portion, so as to overcome spatial constraints of the first conductive portion and the second conductive portion forming the housing of the electronic device, which require a half-wavelength separation distance of the signal. The first conductive portion and the second conductive portion may receive signals through different wireless communication circuits. In case where the first conductive portion and the second conductive portion are used as a common radiator, the signals transferred to the first conductive portion and the second conductive portion may include substantially the same data and have different phases. With the first conductive portion and the second conductive portion that transmit the signals having different phases to the outside, the electronic device can improve the directivity of the transmission signals.

According to yet another embodiment, the electronic device may include a first switch (e.g., a first switch 511 in FIG. 12) and a second switch (e.g., a second switch 512 in FIG. 12). The first switch may be disposed between the first conductive portion and the ground. The second switch may be disposed between the second conductive portion and the ground. The electronic device may further include a flange (e.g., a conductive flange 1210 of FIG. 12). The flange may connect the first conductive portion and the ground.

According to an embodiment, the processor may be configured to electrically disconnect the first conductive portion and the ground via the first switch, while the first signal is transmitted. The processor may be configured to electrically disconnect the second conductive portion and the ground via the second switch, while the second signal is transmitted.

According to an embodiment, in the electronic device, the first conductive portion may be symmetrical to the second conductive portion with respect to the non-conductive portion.

According to an embodiment, the housing may include a first side surface, a second side surface extending perpendicular to the first side surface from one end of the first side surface, and a third side surface extending parallel to the second side surface from the other end of the first side surface. The first conductive portion may be disposed along a portion of the first side surface and the second side surface. The second conductive portion may be disposed along a portion of the first side surface and the third side surface. A distance from the second end of the first conductive portion positioned at the second side surface to the first side surface may be substantially the same as a distance from the fourth end of the second conductive portion positioned at the third side surface to the first side surface.

According to yet another embodiment, a distance between the first conductive portion and the second conductive portion may be shorter than a half-wavelength of the first power or the second power.

According to the above-described embodiment, the electronic device can improve the directivity of the first signal, by combining the first signal radiated from the first conductive portion and the first signal radiated from the second conductive portion.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an example, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a processor (e.g., a processor 120 of an electronic device 101) of the machine invokes at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a housing comprising a first conductive portion disposed along a portion of a top side surface of the housing, a second conductive portion disposed along another portion of the top side surface, and a non-conductive portion between the first conductive portion and the second conductive portion;

a phase shifter;

a power divider that is connected to the first conductive portion, and is connected to the second conductive portion through the phase shifter; and wireless communication circuitry, connected to the power divider, configured to provide, to the power divider, a first signal having a first phase and a first power to concurrently radiate a second signal via the first conductive portion and a third signal via the second conductive portion, wherein the second signal radiated via the first conductive portion has a second power divided from the first power by the power divider and the first phase, wherein the third signal radiated via the second conductive portion has a third power divided from the first power by the power divider and a second phase shifted from the first phase by the phase shifter for a directivity according to radiating the second signal and the third signal, wherein a distance between an end of the first conductive portion adjacent to the second conductive portion and an end of the second conductive portion adjacent to the first conductive portion is shorter than a half wavelength of the second signal or the third signal, and wherein the phase shifter is configured to compensate for the distance which is shorter than the half wavelength by shifting the first phase to the second phase.

2. The electronic device according to claim 1, wherein a difference between the first phase and the second phase is 40 to 60 degrees, for constructive interference of the second and third signals.

3. The electronic device according to claim 1, wherein data transmitted to a satellite by radiating the second signal is identical to data transmitted to the satellite by radiating the third signal.

4. The electronic device according to claim 1, further comprising:

a ground portion in the housing, spaced apart from the first conductive portion and the second conductive portion;

a first switch disposed between the first conductive portion and the ground portion; and a second switch disposed between the second conductive portion and the ground portion, wherein the first switch is configured to disconnect the first conductive portion and the ground portion, while the second signal of the first phase is transmitted in the state of communicating with a satellite, and wherein the second switch is configured to disconnect the second conductive portion and the ground portion, while the third signal is transmitted in another state of communicating without the satellite.

5. The electronic device according to claim 1, further comprising:

a display disposed on a surface of the housing; and a camera configured to obtain an image through a portion of the surface on which the display is disposed; and wherein the housing includes a first side surface, a second side surface extending from an end of the first side surface in a direction perpendicular to the first side surface, a third side surface extending from another end of the first side surface in the direction perpendicular to the first side surface, and a fourth side surface between the second side surface and the third side surface and parallel to the first side surface, wherein at least part of the first conductive portion and at least part of the second conductive portion is disposed on the first side surface closer to the camera than the fourth side surface.

6. The electronic device according to claim 1, further comprising:

another wireless communication circuitry distinct from the wireless communication circuitry connected to the first conductive portion, wherein the other wireless communication circuitry is configured to provide a fourth signal having a fourth power and radiated using the first conductive portion.

7. The electronic device according to claim 6, wherein the other wireless communication circuitry is configured to be inactivated while the second signal and the third signal are radiated in the state of communicating with a satellite.

8. The electronic device according to claim 6, wherein the wireless communication circuitry is configured to be inactivated while the fourth signal is radiated using the first conductive portion in another state of communicating without a satellite.

9. The electronic device according to claim 8, further comprising:

a filter connecting the other wireless communication circuitry and the first conductive portion, wherein the filter is configured to filter at least a part of the fourth signal, while the second signal is radiated using the first conductive portion.

10. The electronic device according to claim 1, wherein the first conductive portion and the second conductive portion are used for satellite communication, wherein the first conductive portion is also used for radiating a fourth signal on a first frequency band, wherein the second conductive portion is also used for radiating a fifth signal on a second frequency band, and wherein the first frequency band and the second frequency band are different from a frequency band for the satellite communication.

11. The electronic device according to claim 1, wherein the first conductive portion is symmetrical to the second conductive portion with respect to the non-conductive portion.

12. The electronic device according to claim 1, wherein the first conductive portion is asymmetrical to the second conductive portion with respect to the non-conductive portion.

13. The electronic device according to claim 1, wherein a radiating pattern is formed in a direction of the top side surface while the first conductive portion and the second conductive portion are used for satellite communication.

14. The electronic device according to claim 1, wherein the housing comprises a first side surface, a second side surface extending perpendicularly to the first side surface from an end of the first side surface, and a third side surface extending parallel to the second side surface from another end of the first side surface, wherein the first conductive portion is disposed along a portion of the first side surface and the second side surface, wherein the second conductive portion is disposed along another portion of the first side surface and the third side surface, and wherein a distance from an end of the first conductive portion located at the second side surface to the first side surface is equal to the distance from an end of the second conductive portion located at the third side surface to the first side surface.

15. The electronic device according to claim 1, wherein the first conductive portion and the second conductive portion operate as an antenna radiator, and wherein a combined signal of the second signal radiated using the first conductive portion and the third signal radiated using the second conductive portion is transmitted in a direction perpendicular to the side surface.

16. The electronic device according to claim 1, wherein a frequency band of the first signal is 1.6 GHz to 1.7 GHZ.

17. An electronic device comprising:

a housing comprising a first conductive portion disposed along a portion of a top side surface of the housing, a second conductive portion disposed along another portion of the top side surface, and a non-conductive portion between the first conductive portion and the second conductive portion;

a phase shifter;

a power divider that is connected to the first conductive portion, and is connected to the second conductive portion through the phase shifter; and wireless communication circuitry, connected to the power divider, configured to:

provide, to the power divider, a first signal having a first phase and a first power to concurrently radiate a second signal via the first conductive portion and a third signal via the second conductive portion, wherein the phase shifter, the power divider and the wireless communication circuitry are disposed on at least one substrate, and wherein the second signal radiated via the first conductive portion has a second power divided from the first power by the power divider and the first phase, wherein the third signal radiated via the second conductive portion has a third power divided from the first power by the power divider and a second phase shifted from the first phase by the phase shifter for a beamforming gain according to radiating the second signal and the third signal, wherein a distance between an end of the first conductive portion adjacent to the second conductive portion and an end of the second conductive portion adjacent to the first conductive portion is shorter than a half wavelength of the second signal or the third signal, and wherein the phase shifter is configured to compensate for the distance which is shorter than the half wavelength by shifting the first phase to the second phase.

18. The electronic device according to claim 17, wherein data transmitted to a satellite by radiating the second signal is identical to data transmitted to the satellite by radiating the third signal.

19. The electronic device according to claim 17, further comprising:

a ground portion in the housing, spaced apart from the first conductive portion and the second conductive portion;

a first switch disposed between the first conductive portion and the ground portion; and a second switch disposed between the second conductive portion and the ground portion, wherein the first switch is configured to disconnect the first conductive portion and the ground portion, while the second signal of the first phase is transmitted in the state of communicating with a satellite, wherein the second switch is configured to disconnect the second conductive portion and the ground portion, while the third signal is transmitted in another state of communicating without the satellite.

20. The electronic device according to claim 17, further comprising:

other wireless communication circuitry distinct from the wireless communication circuitry connected to the first conductive portion, wherein the other wireless communication circuitry is configured to provide a fourth signal having a fourth power and radiated using the first conductive portion, wherein the other wireless communication circuitry is configured to be inactivated while the second signal and the third signal are radiated in the state of communicating with the satellite, and wherein the wireless communication circuitry is configured to be inactivated while the fourth signal is radiated using the first conductive portion in another state of communicating without the satellite.

* * * * *